(12) United States Patent
Maamari et al.

(10) Patent No.: US 12,557,024 B2
(45) Date of Patent: Feb. 17, 2026

(54) LOW POWER WAKE-UP SIGNAL FOR SMALL DATA TRANSFER

(71) Applicant: QUALCOMM Incorporated, San Diego, CA (US)

(72) Inventors: Diana Maamari, San Diego, CA (US); Ahmed Elshafie, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 18/462,890

(22) Filed: Sep. 7, 2023

(65) Prior Publication Data

US 2025/0088965 A1    Mar. 13, 2025

(51) Int. Cl.
   *H04W 52/02*   (2009.01)
   *H04W 52/14*   (2009.01)
   *H04W 72/21*   (2023.01)

(52) U.S. Cl.
   CPC ..... *H04W 52/0235* (2013.01); *H04W 52/143* (2013.01); *H04W 72/21* (2023.01)

(58) Field of Classification Search
   CPC ........... H04W 52/0235; H04W 52/143; H04W 72/21; H04W 52/0216; H04W 52/028; Y02D 30/70
   See application file for complete search history.

(56) References Cited

U.S. PATENT DOCUMENTS

| | | | | |
|---|---|---|---|---|
| 2010/0098008 A1* | 4/2010 | Ishii | ..... | H04W 72/563 370/329 |
| 2012/0207040 A1* | 8/2012 | Comsa | ..... | H04W 72/1215 370/252 |
| 2014/0295858 A1* | 10/2014 | Li | ..... | H04W 48/06 455/450 |

(Continued)

FOREIGN PATENT DOCUMENTS

WO    WO-2023154446 A1    8/2023

OTHER PUBLICATIONS

International Search Report and Written Opinion—PCT/US2024/043472—ISA/EPO—Jan. 2, 2025.

(Continued)

*Primary Examiner* — Christine Ng
(74) *Attorney, Agent, or Firm* — Holland & Hart LLP

(57) ABSTRACT

Methods, systems, and devices for wireless communications are described. The techniques described herein relate to a low-power wake-up signal (LP-WUS) for a small data transfer. A user equipment (UE) receives control signaling including a configuration of resources for a subsequent transmission by the UE of a first uplink message having a data size below a configured threshold. The UE transmits the first uplink message in the resources indicated by the control signaling, the first uplink message having the data size below the configured threshold. The UE monitors for a first downlink message from a network entity in response to transmitting the first uplink message, which includes the (Continued)

LP-WUS. The UE monitors, in response to detection of the LP-WUS, for a second downlink message from the network entity, the second downlink message including a dynamic grant. The UE communicates a second uplink message based on the dynamic grant.

30 Claims, 14 Drawing Sheets

(56) References Cited

U.S. PATENT DOCUMENTS

| | | | |
|---|---|---|---|
| 2016/0143034 A1* | 5/2016 | Mochizuki | H04L 5/0039 370/329 |
| 2020/0145921 A1* | 5/2020 | Zhang | H04W 52/0235 |
| 2022/0053530 A1* | 2/2022 | Ahmed | H04W 76/28 |
| 2022/0078697 A1 | 3/2022 | Tseng et al. | |
| 2023/0217499 A1 | 7/2023 | Jeon et al. | |
| 2023/0269664 A1* | 8/2023 | Ganesan | H04W 52/0229 370/311 |
| 2024/0349384 A1* | 10/2024 | Hu | H04W 76/20 |
| 2025/0088965 A1* | 3/2025 | Maamari | H04W 52/0235 |
| 2025/0253998 A1* | 8/2025 | Katla | H04W 72/0446 |

OTHER PUBLICATIONS

Nokia, et al., "Low Power WUS Evaluation Methodology", 3GPPTSG RAN WG1 #113, R1-2304414, 3rd Generation Partnership Project, Mobile Competence Centre, 650, Route Des Lucioles, F-06921 Sophia-Antipolis Cedex, France, vol. 3GPP Ran 1, No. Incheon, Korea, May 22, 2023-May 26, 2023, May 18, 2023, 28 Pages, XP052393725, The Whole Document.

* cited by examiner

LOW POWER WAKE-UP SIGNAL FOR SMALL DATA TRANSFER

TECHNICAL FIELD

The following relates to wireless communications, including a low power wake-up signal for a small data transfer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

Some wireless communication systems may support communications in which a device, such as a UE, remains in an inactive state while communicating a small quantity of data (e.g., below a threshold amount of data) to a network entity. In such systems, such as a small data transfer (SDT) system, the UE may communicate data or transmit signals while the UE remains in the inactive state without transitioning to a connected state. In some cases, SDT communications may involve continuous monitoring by the UE of a channel, which may result in the unnecessarily consuming power.

SUMMARY

The described techniques relate to improved methods, systems, devices, and apparatuses that support low power wake-up signal (LP-WUS) for small data transfers (SDT). A UE may remain in the inactive state (e.g., sleep state or mode) in the absence of a retransmission or dynamic grant detected in a physical downlink control channel (PDCCH). An LP-WUS may be transmitted from the network entity to the UE in order to transition the UE from the inactive state to an active state (e.g., wake up UE from the sleep state), for example, to monitor the PDCCH. During the SDT, the UE may receive control signaling that indicates resources for subsequent transmission by the UE for an uplink message and that includes a radio resource control (RRC) control message, which causes the UE to enter an RRC inactive mode. The UE may transmit a first uplink message (e.g., an RRC resume request) in the resources indicated in the control signaling. The UE may monitor for the LP-WUS after transmitting the first uplink message, and then monitor the PDCCH for a dynamic grant. After receiving the dynamic grant, the UE may communicate a second uplink message based on the dynamic grant. In some examples, the UE may monitor for the LP-WUS in a first power state of a first radio (e.g., a low power wake-up radio (LP-WUR)) of the UE and the UE may monitor for the PDCCH (e.g., for the dynamic grant) in a second power state of a second radio (e.g., a main radio) of the UE. The first power state may correspond to less power consumption at the UE than the second power state. The UE remaining in a low power state of the first radio while monitoring for the LP-WUS and then transitioning to the high power state of the second radio after receiving the LP-WUS (e.g., providing an indication to monitor the PDCCH) rather than constantly monitoring the PDCCH in the high power state of the second radio, may facilitate reduced power consumption at the UE when the UE is inactive during the SDT procedure.

A method for wireless communications by a UE is described. The method may include receiving control signaling including a configuration of resources for a subsequent transmission by the UE of a first uplink message having a data size below a configured threshold, transmitting the first uplink message in the resources indicated by the control signaling, the first uplink message having the data size below the configured threshold, monitoring for a first downlink message from a network entity in response to transmitting the first uplink message, the first downlink message including an LP-WUS, monitoring, in response to detection of the LP-WUS, for a second downlink message from the network entity, the second downlink message including a dynamic grant, and communicating a second uplink message based on the dynamic grant.

A UE for wireless communications is described. The UE may include one or more memories storing processor executable code, and one or more processors coupled with the one or more memories. The one or more processors may individually or collectively operable to execute the code to cause the UE to receive control signaling including a configuration of resources for a subsequent transmission by the UE of a first uplink message having a data size below a configured threshold, transmit the first uplink message in the resources indicated by the control signaling, the first uplink message having the data size below the configured threshold, monitor for a first downlink message from a network entity in response to transmitting the first uplink message, the first downlink message including an LP-WUS, monitor, in response to detection of the LP-WUS, for a second downlink message from the network entity, the second downlink message including a dynamic grant, and communicate a second uplink message based on the dynamic grant.

Another UE for wireless communications is described. The UE may include means for receiving control signaling including a configuration of resources for a subsequent transmission by the UE of a first uplink message having a data size below a configured threshold, means for transmitting the first uplink message in the resources indicated by the control signaling, the first uplink message having the data size below the configured threshold, means for monitoring for a first downlink message from a network entity in response to transmitting the first uplink message, the first downlink message including an LP-WUS, means for monitoring, in response to detection of the LP-WUS, for a second downlink message from the network entity, the second downlink message including a dynamic grant, and means for communicating a second uplink message based on the dynamic grant.

A non-transitory computer-readable medium storing code for wireless communications is described. The code may include instructions executable by at least one processor (e.g., directly, indirectly, after pre-processing, without pre-processing) to receive control signaling including a configuration of resources for a subsequent transmission by the UE of a first uplink message having a data size below a configured threshold, transmit the first uplink message in the resources indicated by the control signaling, the first uplink message having the data size below the configured threshold, monitor for a first downlink message from a network entity in response to transmitting the first uplink message, the first downlink message including an LP-WUS, monitor, in response to detection of the LP-WUS, for a second downlink message from the network entity, the second downlink message including a dynamic grant, and communicate a second uplink message based on the dynamic grant.

In some examples of the method, UEs, and non-transitory computer-readable medium described herein, monitoring for the first downlink message and monitoring for the second downlink message may include operations, features, means, or instructions for monitoring for the first downlink message in a first power state and monitoring for the second downlink message in a second power state, the first power state corresponding to less power consumption at the UE than the second power state.

In some examples of the method, UEs, and non-transitory computer-readable medium described herein, the first power state may be associated with a first radio at the UE and the second power state may be associated with a second radio at the UE.

In some examples of the method, UEs, and non-transitory computer-readable medium described herein, the control signaling includes an RRC message and the method, apparatuses, and non-transitory computer-readable medium may include further operations, features, means, or instructions for entering an RRC inactive mode in response to receiving the RRC release message and transmitting an RRC resume request in the first uplink message.

In some examples of the method, UEs, and non-transitory computer-readable medium described herein, the LP-WUS includes an updated configuration for the resources indicated by the control signaling.

In some examples of the method, UEs, and non-transitory computer-readable medium described herein, the LP-WUS includes a message to activate, deactivate, update, release, or any combination thereof, one or more configuration parameters associated with the resources indicated by the control signaling.

In some examples of the method, UEs, and non-transitory computer-readable medium described herein, the LP-WUS includes an update to a timing alignment timer (TAT) associated with the resources indicated by the control signaling, or an update to a reference signal received power threshold associated with a synchronization signal block, or both.

In some examples of the method, UEs, and non-transitory computer-readable medium described herein, the control signaling includes an RRC release message and the method, apparatuses, and non-transitory computer-readable medium may include further operations, features, means, or instructions for entering an RRC active mode in response to monitoring for the second downlink message including the dynamic grant.

In some examples of the method, UEs, and non-transitory computer-readable medium described herein, the configuration of resources for the subsequent transmission by the UE includes a configured grant resource configuration.

In some examples of the method, UEs, and non-transitory computer-readable medium described herein, the control signaling indicates an LP-WUR configuration.

In some examples of the method, UEs, and non-transitory computer-readable medium described herein, the control signaling indicates a mapping between one or more monitoring occasions for the LP-WUS and one or more search space monitoring occasions.

Some examples of the method, UEs, and non-transitory computer-readable medium described herein may further include operations, features, means, or instructions for monitoring for the first downlink message may be in response to a signal strength measurement of a low-power synchronization signal being greater than a signal strength threshold.

In some examples of the method, UEs, and non-transitory computer-readable medium described herein, the uplink message having the data size below the configured threshold includes a configured grant SDT (CG-SDT), or a random access small data transmission (RA-SDT), or both.

A method for wireless communications by a network entity is described. The method may include transmitting control signaling including a configuration of resources for a subsequent reception from a UE of a first uplink message having a data size below a configured threshold, receiving, from the UE, the first uplink message in the resources indicated by the control signaling, the first uplink message having the data size below the configured threshold, transmitting a first downlink message to the UE in response to receiving the first uplink message, the first downlink message including an LP-WUS, transmitting, in response to transmitting the LP-WUS, a second downlink message to the UE, the second downlink message including a dynamic grant, and receiving a second uplink message based on the dynamic grant.

A network entity for wireless communications is described. The network entity may include one or more memories storing processor executable code, and one or more processors coupled with the one or more memories. The one or more processors may individually or collectively operable to execute the code to cause the network entity to transmit control signaling including a configuration of resources for a subsequent reception from a UE of a first uplink message having a data size below a configured threshold, receive, from the UE, the first uplink message in the resources indicated by the control signaling, the first uplink message having the data size below the configured threshold, transmit a first downlink message to the UE in response to receiving the first uplink message, the first downlink message including an LP-WUS, transmit, in response to transmitting the LP-WUS, a second downlink message to the UE, the second downlink message including a dynamic grant, and receive a second uplink message based on the dynamic grant.

Another network entity for wireless communications is described. The network entity may include means for transmitting control signaling including a configuration of resources for a subsequent reception from a UE of a first uplink message having a data size below a configured threshold, means for receiving, from the UE, the first uplink message in the resources indicated by the control signaling, the first uplink message having the data size below the configured threshold, means for transmitting a first downlink message to the UE in response to receiving the first uplink message, the first downlink message including an LP-WUS, means for transmitting, in response to transmitting the LP-WUS, a second downlink message to the UE, the second downlink message including a dynamic grant, and means for receiving a second uplink message based on the dynamic grant.

A non-transitory computer-readable medium storing code for wireless communications is described. The code may include instructions executable by at least one processor (e.g., directly, indirectly, after pre-processing, without pre-processing) to transmit control signaling including a configuration of resources for a subsequent reception from a UE of a first uplink message having a data size below a configured threshold, receive, from the UE, the first uplink message in the resources indicated by the control signaling, the first uplink message having the data size below the configured threshold, transmit a first downlink message to the UE in response to receiving the first uplink message, the first downlink message including an LP-WUS, transmit, in response to transmitting the LP-WUS, a second downlink message to the UE, the second downlink message including a dynamic grant, and receive a second uplink message based on the dynamic grant.

In some examples of the method, network entities, and non-transitory computer-readable medium described herein, the LP-WUS includes an updated configuration for the resources indicated by the control signaling.

In some examples of the method, network entities, and non-transitory computer-readable medium described herein, the LP-WUS includes a message to activate, deactivate, update, release, or any combination thereof, one or more configuration parameters associated with the resources indicated by the control signaling.

In some examples of the method, network entities, and non-transitory computer-readable medium described herein, the LP-WUS includes an update to a TAT associated with the resources indicated by the control signaling, or an update to a reference signal received power threshold associated with a synchronization signal block, or both.

In some examples of the method, network entities, and non-transitory computer-readable medium described herein, the configuration of resources includes a configured grant resource configuration.

In some examples of the method, network entities, and non-transitory computer-readable medium described herein, the control signaling indicates an LP-WUR configuration.

In some examples of the method, network entities, and non-transitory computer-readable medium described herein, the control signaling indicates a mapping between one or more monitoring occasions for the LP-WUS and one or more search space monitoring occasions.

Some examples of the method, network entities, and non-transitory computer-readable medium described herein may further include operations, features, means, or instructions for transmitting the first downlink message may be in response to a signal strength measurement of a low-power synchronization signal being greater than a signal strength threshold.

In some examples of the method, network entities, and non-transitory computer-readable medium described herein, the uplink message having the data size below the configured threshold includes a CG-SDT, or an RA-SDT, or both.

DETAILED DESCRIPTION

Figure 1:
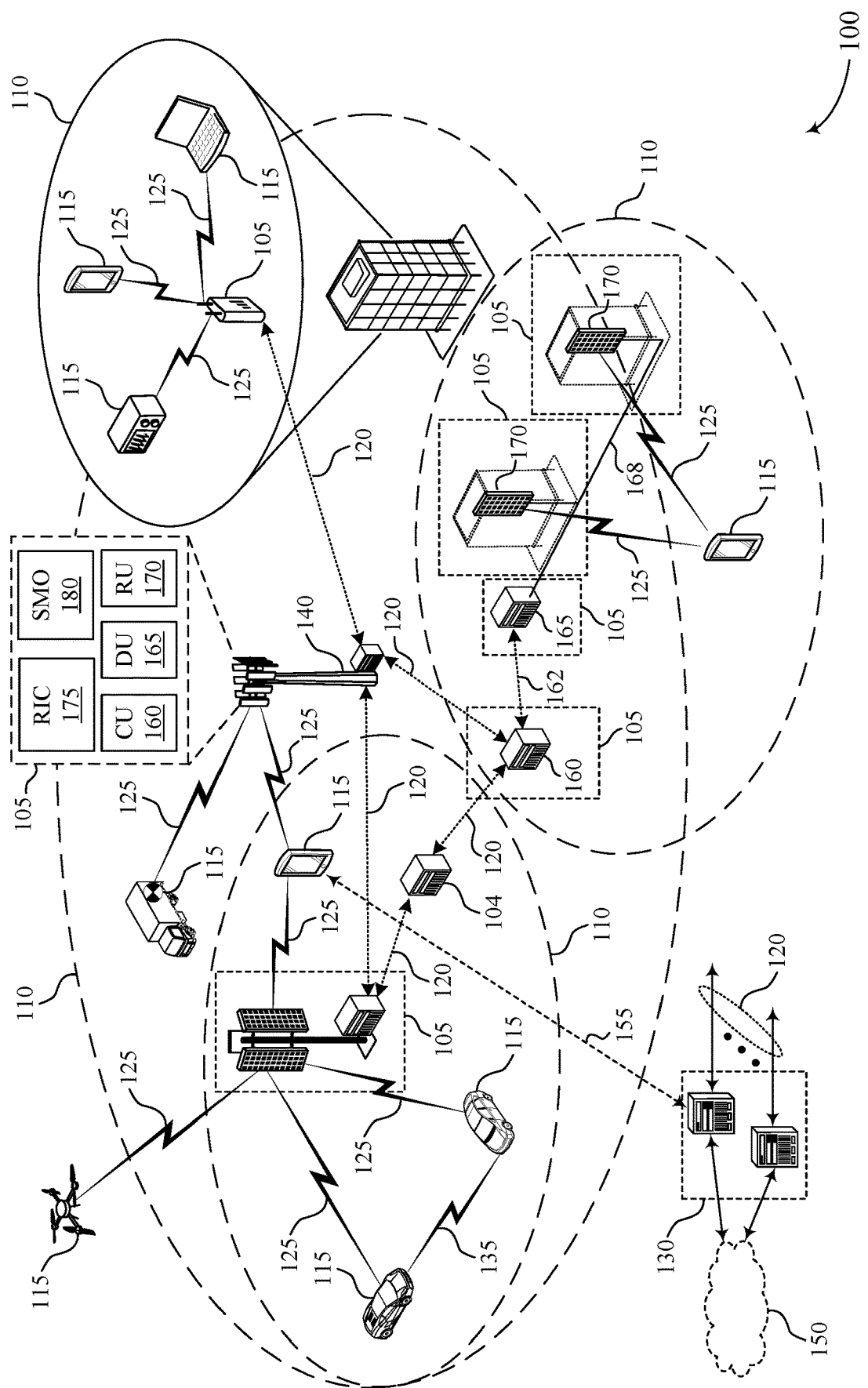
FIG. 1 shows an example of a wireless communications system that supports low power wake-up signal (LP-WUS) for small data transfer (SDT) in accordance with one or more aspects of the present disclosure.

Some wireless communication systems may support communications in which a device, such as a user equipment (UE), remains in an inactive state while communicating a small quantity of data (e.g., below a threshold amount of data) to a network entity. In such systems, such as a small data transfer (SDT) system, the UE may communicate data or transmit signals while the UE remains in the inactive state without transitioning to a connected state. The SDT procedure may be initiated over a random access channel (RACH) or over resources indicated in a configured grant. However, during the SDT procedure and while the UE is in the inactive state, the UE may continuously monitor a physical downlink control channel (PDCCH), for example, for a dynamic grant indicating a retransmission or a new transmission. The continuous monitoring may result in unnecessarily consuming power at the UE.

A UE may remain in the inactive state (e.g., sleep state or mode) in the absence of a retransmission or dynamic grant detected the PDCCH. An LP-WUS may be transmitted from the network entity to the UE in order to transition the UE from the inactive state to an active state (e.g., wake up UE from the sleep state), for example, to monitor the PDCCH. During the SDT, the UE may receive control signaling that indicates resources for subsequent transmission by the UE for an uplink message and that includes a radio resource control (RRC) control message, which causes the UE to enter an RRC inactive mode. The UE may transmit a first uplink message (e.g., an RRC resume request) in the resources indicated in the control signaling. The UE may monitor for the LP-WUS after transmitting the first uplink message, and then monitor the PDCCH for a dynamic grant. After receiving the dynamic grant in the PDCCH, the UE may communicate a second uplink message based on the dynamic grant.

In some examples, the UE may monitor for the LP-WUS in a first power state of a first radio (e.g., a low power wake-up radio (LP-WUR)) of the UE and the UE may monitor for the PDCCH (e.g., for the dynamic grant) in a second power state of a second radio (e.g., a main radio) of the UE. The first power state may correspond to less power consumption at the UE than the second power state. The UE remaining in a low power state of the first radio while monitoring for the LP-WUS and then transitioning to the high power state of the second radio after receiving the LP-WUS (e.g., providing an indication to monitor the PDCCH) rather than constantly monitoring the PDCCH in the high power state of the second radio, may facilitate reduced power consumption at the UE when the UE is inactive during the SDT procedure.

In some examples, the LP-WUS may include an update to a timing alignment timer (TAT) associated with the configured resources indicated by the control signaling or an update to a reference signal received power (RSRP) threshold associated with a synchronization signal block (SSB). In some examples, the LP-WUS may include one or more configured grant resource configurations that is different than the resource configuration provided in the control signaling. The LP-WUS may include a message to activate, deactivate, update, or release, one or more configuration parameters associated with the configured resources indicated by the control signaling. In some examples, the control signaling may indicate a mapping between an LP-WUS monitoring occasion (e.g., associated with the LP-WUS) and a search space monitoring occasion (e.g., associated with the PDCCH). Additionally, in some examples, the UE may use an LP-WUS during a subsequent data transfer if the power measurement (e.g., signal-to-interference-plus-noise ratio (SINR)) of a low power synchronization signal (LP-SS) of the LP-WUS is above a threshold.

Aspects of the disclosure are initially described in the context of wireless communications systems. Aspects of the disclosure are further illustrated by and described with reference to apparatus diagrams, system diagrams, and flowcharts that relate to LP-WUS for SDT.

FIG. 1 shows an example of a wireless communications system 100 that supports LP-WUS for SDT in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support LP-WUS for SDT as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots asssociated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz. The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Additionally, in some examples, the UE 115 may transmit an SDT to the network entity 105. For example, the UE 115 may remain in an inactive state while communicating the SDT (e.g., below a threshold amount of data) to the network entity 105. In such systems, the UE 115 may communicate data or transmit signals while the UE 115 remains in the inactive state without transitioning to a connected state. The SDT procedure may be initiated over a RACH or over resources indicated in a configured grant. However, during the SDT procedure and while the UE 115 is in the inactive state, the UE 115 may continuously monitor the PDCCH, for example, for a dynamic grant indicating a retransmission or a new transmission. The continuous monitoring may result in unnecessarily consuming power at the UE 115.

As discussed herein, a UE 115 may remain in the inactive state (e.g., sleep state) in the absence of a retransmission or dynamic grant. An LP-WUS may be transmitted from the network entity 105 to the UE 115 in order to transition the UE 115 from the inactive state to an active state (e.g., wake up UE 115 from sleep state), for example, to monitor the PDCCH. During the SDT, the UE may receive control signaling that indicates resources for subsequent transmission by the UE 115 for an uplink message and that includes an RRC control message, which causes the UE 115 to enter an RRC inactive state. The UE 115 may transmit the first uplink message (e.g., an RRC resume request) in the resources indicated in the control signaling. The UE 115 may monitor for the LP-WUS after transmitting the first uplink message, and then monitor the PDCCH for a dynamic grant. After receiving the dynamic grant, the UE 115 may communicate a second uplink message based on the dynamic grant. In some examples, the UE 115 may monitor for the LP-WUS in a in a first power state of a first radio of the UE 115 (e.g., an LP-WUR) and the UE may monitor for the PDCCH (e.g., for the dynamic grant) in a second power state of a second radio of the UE 115 (e.g., the main radio). The first power state may correspond to less power consumption at the UE 115 than the second power state. The UE 115 remaining in a low power state of the first radio while monitoring for the LP-WUS and then transitioning to the high power state of the second radio after receiving the LP-WUS (e.g., providing an indication to monitor the PDCCH) rather than constantly monitoring the PDCCH in the high power state of the second radio, may facilitate reduced power consumption at the UE 115 when the UE 115 is inactive during the SDT procedure.

In some examples, the LP-WUS may include an update to a TAT associated with the configured resources indicated by the control signaling or an update to a RSRP threshold associated with an SSB. In some examples, the LP-WUS may include one or more configured grant resource configurations that is different than the resource configuration provided in the control signaling. The LP-WUS may include a message to activate, deactivate, update, or release, one or more configuration parameters associated with the configured resources indicated by the control signaling. In some examples, the control signaling may indicate a mapping between an LP-WUS monitoring occasion (e.g., associated with the LP-WUS) and a search space monitoring occasion (e.g., associated with the PDCCH). Additionally, in some examples, the UE may use an LP-WUS during subsequent data transfer if the power measurement (e.g., SINR, RSRP, or a reference signal received quality (RSRQ)) of an LP-SS of the LP-WUS is above a threshold.

Figure 2:
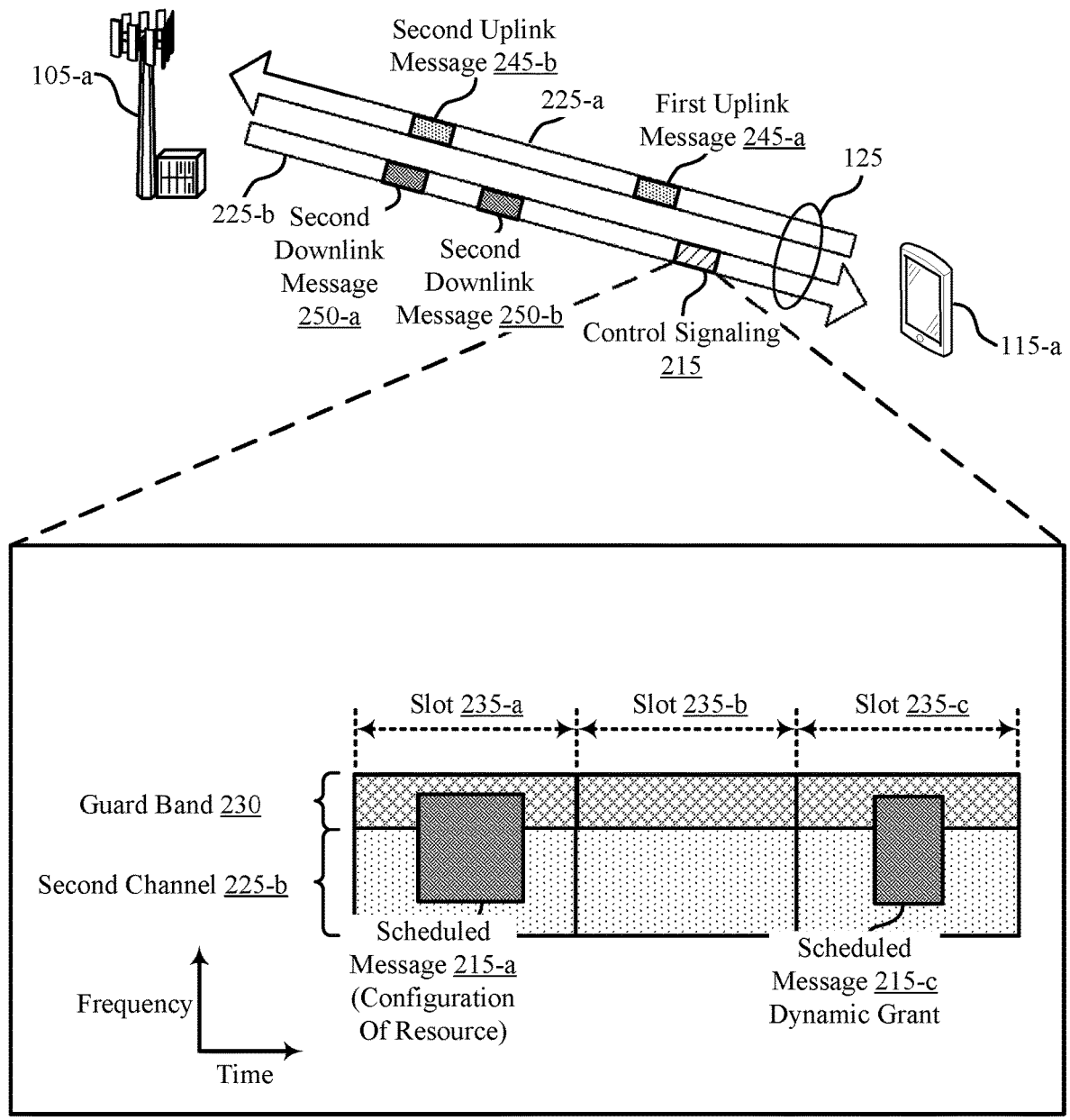
FIG. 2 shows an example of a wireless communications system that supports LP-WUS for SDT in accordance with one or more aspects of the present disclosure.

FIG. 2 shows an example of a wireless communications system 200 that supports LP-WUS for SDT in accordance with one or more aspects of the present disclosure. The wireless communications system 200 may implement aspects of or may be implemented by aspects of the wireless communications system 100. For example, the wireless communications system 200 includes a UE 115-*a* and a network entity 105-*a*, which may be examples of a UE 115 described with respect to FIG. 1. Although the following discussions describe a configured grant SDT (CG-SDT) procedure, the techniques described herein may additionally, or alternatively, apply to a random access SDT (RA-SDT).

In some examples, the UE 115-*a* may include an LP-WUR and a main radio. The LP-WUR may be a radio receiver circuit that supports a low energy consumption. When data is not received at the UE 115-*a* or data is not to be transmitted by the UE 115-*a*, the main radio of the UE 115-*a* may be in an ultra-low power state (ULPS) and the LP-WUR may actively monitor for an LP-WUS. For example, when data is to be received at the UE 115-*a* (e.g., at a receiver of the UE 115-*a*), then the LP-WUR may receive an on-demand LP-WUS, and the UE 115-*a* may subsequently activate the main radio. In some cases, the LP-WUS may indicate that data is to be received at the UE 115-*a*.

The LP-WUS may facilitate in reducing unnecessary paging receptions at the UE 115-*a*. In particular, the LP-WUS may be transmitted to the UE 115-*a* if there is paging for a UE 115-*a* that is in an idle or inactive state. If the LP-WUS is detected at the UE 115-*a*, then the main radio may be turned on. The UE 115-*b* may monitor for SSBs before PDCCH monitoring occasions (PO) for synchronization with the network entity 105-*a*, and the paging may be received according to the synchronization. However, if the LP-WUS is not detected, then the main radio may continue in the sleeping state, such as a deep sleep or ULPS mode, for example, for power saving purposes.

The SDT procedure may be a procedure that allows data or signaling transmission while remaining in an RRC inactive state (RRC_INACTIVE state), for example, without transitioning to an RRC connected state (RRC_CONNECTED state). An SDT may be configured and may be enabled based on a radio bearer, such as on based on a data radio bearer (DRB) or based on a signaling radio bearer (SRB). The SDT may be initiated by the UE 115-*a* if the corresponding criteria for the radio bearer is met. The SDT may be initiated with either a transmission over RACH (configured via system information (SI)) or over Type 1 configured grant resources that are configured via dedicated signaling in an RRC release message, for example, by leveraging an RRC resume procedure.

Once initiated, the SDT procedure may successfully complete after the UE 115-*a* is directed to an RRC idle state (RRC_IDLE), the RRC inactive state (RRC_INACTIVE), or the RRC connected state (RRC_CONNECTED). If completion of the SDT procedure is unsuccessful, the UE 115-*a* may transition to the RRC idle state.

The configuration of the configured grant resources for a UE 115-*a* performing an SDT may be included in an in RRC release message. The RRC release message may also facilitate reconfiguring or releasing the CG-SDT resources while the UE 115-*a* is the inactive state. The configure grant resources for SDT may be valid within the cell that the UE 115-*a* receives the RRC release message, causing the UE 115-*a* to transition to the RRC inactive state. In some examples, the network may support configuring one or multiple CG-SDT resource configurations transmitted to the UE 115-*a* while the UE 115-*a* is in the RRC inactive state.

However, during CG-SDT, there may be no discontinuous reception. For example, the UE 115-*a* may continuously monitor the PDCCH to receive retransmission or the dynamic grant for new transmissions. For CG-SDT, the UE 115-*a* may monitor for the dynamic grants using configuration of a UE-specific search space (USS) set (e.g., sdt-CG-Search Space) or configuration of a common search space (CSS) set (e.g., sdt-SearchSpace) for the UE 115-*a* to monitor for the dynamic grant. For an RA-SDT, the CSS set may be separately configured. In some examples, the UE 115-*a* may monitor the PDCCH that is addressed to a cell radio network temporary identifier (C-RNTI) after successful completion of a contention resolution. If the CSS is not configured, a Type-1 PDCCH CSS (e.g., subset of PDCCH search space that is dedicated to transmit the PDCCH with random access RNTI (RA-RNTI), Temporary C-RNTI (TC-RNTI), or C-RNTI on a primary cell) set may be reused. Constantly monitoring the PDCCH may unnecessarily increase power consumption at the UE 115-*a*. The techniques described herein may facilitate in the UE 115-*a* in continuing to sleep or be inactive in absence of a dynamic grant or retransmission. For example, the LP-WUS may be used to indicate to the UE 115-*a* or a group of UEs 115 to actively monitor the PDCCH.

In the wireless communication system 200, the UE 115-*a* may perform an SDT to the network entity 105-*a*. The network entity 105-*a* may communicate with the UE 115-*a* using a communication link 125. In some examples, the communication link 125 may include a first channel 225-*a* for transmitting data from the UE 115-*a* to the network entity 105-*a* and a second channel 225-*b* for transmitting data from the network entity 105-*a* to the UE 115-*a*. The communication link 125 may be an example of an NR or LTE link between the UE 115-*a* and the network entity 105-*a*. The communication link 125 may include a bi-directional link that enables both uplink and downlink communications, for example, via the channels 225. For example, the UE 115-*a* may transmit uplink messages 245 (e.g., uplink transmissions), such as uplink control signals or uplink data signals, to the network entity 105-*a* using the first channel 225-*a* (e.g., of the communication link 125) and the network entity 105-*a* may transmit downlink messages 250 (e.g., downlink transmissions), such as downlink control signals or downlink data signals, to the UE 115-*a* using the second channel 225-*b* (e.g., of the communication link 125). In some examples, the downlink messages 250 (e.g., a first downlink message 250-*a* and the second downlink message 250-*b*) may be part of the control signaling 215 transmitted form the network entity 105-*a*.

In some examples, wireless networks may utilize guard bands 230 between carriers or communication channels 225 in order to reduce interference between adjacent channels 225. For example, a guard band 230 may be used between carriers or communication channels 225 in order to control the level of interference imposed on one carrier or channel 225 due to transmissions in another carrier or channel 225. For example, a guard band 230 may be positioned between the first channel 225-*a* and the second channel 225-*b* in the frequency domain to prevent communications within the first channel 225-*a* from leaking into the second channel 225-*b* (or vice versa), that may otherwise cause interference. For the purposes of the present disclosure, the terms "channel 225," "carrier," "band," and like terms, may be used to refer to a set of resources in the frequency domain that may be used to perform wireless communications. As such, the terms "channel 225," "carrier," "band," and like terms, may be used interchangeably herein.

The network entity 105-*a* may transmit the control signaling 215 to the UE 115-*a* over the communication link 125. In some examples, the control signaling 215 may include scheduled control signaling message 215-*a* and 215-c, that are communicated over slots 235-a and 235-c, respectively. In some examples, the signaling messages (e.g., the first uplink message) may be transmitted from the UE 115-a in other slots 235, such as 235-b. The UE 115-b may receive the control signaling 215 including the scheduled control signaling message 215-a, which includes a configuration of resources for subsequent transmission by the UE 115-a, such as for a first uplink message having a data size below a configured threshold (e.g., for SDT procedure). In some examples, the configuration of resources for the subsequent transmission by the UE 115-a may include a configured grant resource configuration. In some examples, the control signaling 215 may indicate an LP-WUR configuration for the LP-WUR of the UE 115-a. In some examples, the control signaling 215 may include a mapping between one or more monitoring occasions for the LP-WUS and one or more search space monitoring occasions for the PDCCH. For example, the configuration may include a one-to-one mapping between the monitoring occasions for the LP-WUS and the search space monitoring occasions, or a one-to-N mapping, where N is a quantity greater than one. The mapping configuration may be provided in the RRC release message along with an SDT configuration. In some examples, the control signaling 215 may include an RRC release message. The RRC release message may cause the UE 115-a to enter an RRC inactive state in response to receiving the RRC release message. In some examples, the RRC release message may include specific LP-WUR configurations (e.g., in a manner corresponding to the CG-SDT configuration).

The UE 115-a may transmit the first uplink message 245-a in the resources indicated by the control signaling 215. The first uplink message 245-a may have the data size below the configured threshold. In some examples, the RRC release message may cause the UE 115-a to transmit an RRC resume request in the first uplink message 245-a. In some examples, the uplink message 245-a may have the data size below the threshold for a CG-SDT, an RA-SDT, or both.

The UE 115-a may monitor for the first downlink message 250-a from a network entity 105-a in response to transmitting the first uplink message 245-a. The first downlink message 250-a may include an LP-WUS. The UE 115-a may monitor for the first downlink message 250-a in a first power state (e.g., low power state). In some examples, the LP-WUS may include an updated configuration for the resources indicated by the control signaling 215. In some examples, the LP-WUS may include a signal including a message to activate, deactivate, update, release, or any combination thereof, one or more configuration parameters associated with the resources indicated by the control signaling 215. In some examples, the LP-WUS may include an update to a TAT associated with the resources indicated by the control signaling, or an update to an RSRP threshold associated with a SSB, or both. In some examples, monitoring for the first downlink message 250-a may be in response to a signal strength measurement of the LP-SS being greater than a signal strength threshold. In some examples, the LP-WUS may include an update to an RRC semi-static configured CG-SDT-Configuration, such as configurations for a CG-SDT retransmission timer, a subset of search spaces for the SDT (e.g., SDT-SS-Subset), or other SDT configuration-related parameters.

In some examples, a new TAT (e.g., CG-SDT-TAT timer) may be introduced to control how long a MAC entity may consider transmission of an uplink message 245 for the CG-SDT to be uplink time aligned. The CG-SDT-TAT timer may be configured together with the CG-SDT resource configuration in the RRC release message. The CG-SDT-TAT timer may be started upon receiving the CG-SDT configuration from the network entity 105-a and the CG-SDT-TAT timer may be restarted upon reception of a timing advance (TA) command. In some examples, the UE 115-a may release the CG-SDT resources while maintaining the CG configuration when the CG-SDT-TAT expires. If the CG-SDT-TAT is expired at the initiation of an RA-SDT procedure, the CG-SDT resources may not be used during the RA-SDT. In some examples, an RSRP based TA validation may be applicable to initial SDT transmission phase (e.g., compare stored RSRP threshold or value with the current RSRP of the transmission). When the change of the RSRP (e.g., increase or decrease) is not more than a configured threshold, the TA may be valid. In some examples, the LP-WUS may include a dynamic change of CG-SDT-TAT timer or RSRP thresholds related to SSBs. The LP-WUS may be used as a dynamic indication to activate or deactivate the DRB or SRBs that may use the CG-SDT.

As previously mentioned, during SDT, the UE 115-a may monitor for the LP-WUS after the first uplink message 245-a for potential PDCCH for retransmissions or new transmission. For a CG-SDT, a UE 115-a that detects the LP-WUS may monitor the PDCCH for configuration of the USS set (e.g., sdt-CG-SearchSpace) and the CSS set (e.g., sdt-SearchSpace) for the UE 115-a to monitor for the dynamic grant. For a RA-SDT, the CSS set (e.g., sdt-SearchSpace) may be separately configured. The UE 115-a may monitor the PDCCH addressed to C-RNTI after successful completion of a contention resolution. If the search space (e.g., sdt-SearchSpace) is not configured, a Type-1 PDCCH CSS set may be reused.

In some examples, as previously mentioned, the LP-WUS may include one or more configured grant resource configurations, which may be different than the configured grant resource configuration provided in the RRC release message. In some examples, the LP-WUS may activate, deactivate, release, or update the specific configured grant configuration parameters, such as an offset, time domain resource allocation (TDRA), frequency division resource allocation (FDRA), configured grant timers, periodicity, or a modulation and coding scheme (MCS).

The UE 115-a may monitor, in response to detection of the LP-WUS, for a second downlink message 250-b from the network entity 105-a. In some examples, the second downlink message 250-b may be provided as the scheduled control signaling message 215-c of the control signaling 215. The schedule control signaling message 215-c may include a dynamic grant. In some examples, the UE 115-a may monitor for the second downlink message 250-b in a second power state (e.g., relatively higher power state than the low power state since the LP-WUS detected). Accordingly, the first power state may correspond to less power consumption at the UE 115-a than the second power state. In some examples, the first power state may be associated with a first radio at the UE 115-a (e.g., LP-WUR of the UE 115-a) and the second power state may be associated with a second radio (e.g., main radio of the UE 115-a) at the UE 115-a. In some examples, the control signaling 215 may include an RRC release message, causing the UE 115-a to enter an RRC active state in response to monitoring for the second downlink message including the dynamic grant.

The UE 115-a may communicate a second uplink message 245-b based on the dynamic grant. For example, the subsequent data transmission may include communications between the UE 115-a and the network entity 105-a including communicating additional uplink data, downlink data in response to the uplink data, more uplink data, or an RRC release message (e.g., with suspending current configuration).

Figure 3:
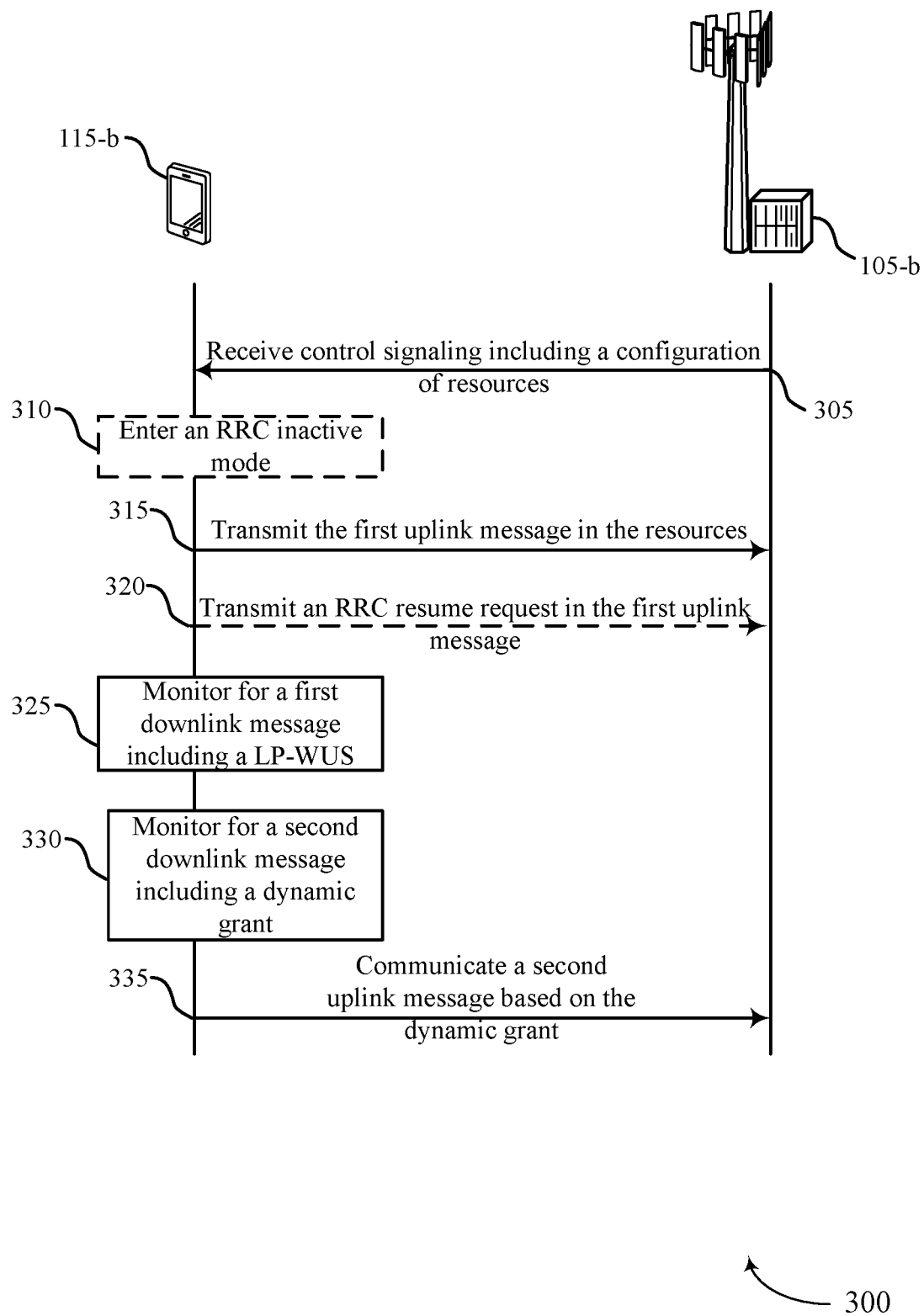
FIG. 3 shows an example of a process flow that supports LP-WUS for SDT in accordance with one or more aspects of the present disclosure.

FIG. 3 shows an example of a process flow 300 that supports LP-WUS for SDT in accordance with one or more aspects of the present disclosure. The process flow 300 may implement aspects of or may be implemented by aspects of the wireless communications system 100 or the wireless communications system 200. For example, the process flow 300 may include a UE 115-*b* and a network entity 105-*b*, which may be an example of a UE 115 and a network entity 105 as described herein. In the following description of the process flow 300, the operations performed by the UE 115-*b* and the network entity 105-*b* may be performed in different orders or at different times than the exemplary order shown. Some operations may also be omitted from the process flow 300, or other operations may be added to the process flow 300. Further, while operations in the process flow 300 are illustrated as being performed by the UE 115-*b* and the network entity 105-*b*, the examples herein are not to be construed as limiting, as the described features may be associated with any quantity of different devices.

At 305, the UE 115-*b* may receive control signaling including a configuration of resources for a subsequent transmission by the UE 115-*b* of a first uplink message having a data size below a configured threshold. In some examples, the configuration of resources for the subsequent transmission by the UE 115-*b* may include a configured grant resource configuration. In some examples, the control signaling may indicate an LP-WUR configuration. In some examples, the control signaling may include a mapping between one or more monitoring occasions for the LP-WUS and one or more search space monitoring occasions.

In some examples, the control signaling may include an RRC release message. In some examples, at 310, the RRC release message may cause the UE 115-*b* to enter a radio resource control inactive mode. At 315, the UE 115-*b* may transmit the first uplink message in the resources indicated by the control signaling. The first uplink message may have the data size below the configured threshold. In some examples, at 320, the RRC release message may cause the UE 115-*b* to transmit an RRC resume request in the first uplink message. In some examples, the uplink message having the data size below the threshold may include a CG-SDT, or a RA-SDT, or both.

At 325, the UE 115-*b* may monitor for a first downlink message from a network entity 105-*b* in response to transmitting the first uplink message. The first downlink message may include an LP-WUS. The UE 115-*b* may monitor for the first downlink message in a first power state (e.g., low power state). In some examples, the LP-WUS may include an updated configuration for the resources indicated by the control signaling. In some examples, the LP-WUS may include a signal including a message to activate, deactivate, update, release, or any combination thereof, one or more configuration parameters associated with the resources indicated by the control signaling. In some examples, the LP-WUS may include an update to TAT associated with the resources indicated by the control signaling, or an update to an RSRP threshold associated with an SSB, or both. In some examples, monitoring for the first downlink message may be in response to a signal strength measurement of the LP-SS being greater than a signal strength threshold.

At 330, the UE 115-*b* may monitor, in response to detection of the LP-WUS, for a second downlink message from the network entity 105-*b*. The second downlink message may include a dynamic grant. In some examples, the UE 115-*b* may monitor for the second downlink message in a second power state (e.g., relatively higher power state than the low power state). Accordingly, the first power state may correspond to less power consumption at the UE 115-*b* than the second power state. In some examples, the first power state may be associated with a first radio of the UE 115-*b* (e.g., LP-WUR) and the second power state may be associated with a second radio of the UE 115-*b* (e.g., main radio). In some examples, the control signaling may include an RRC release message, causing the UE 115-*b* to enter an RRC active mode in response to monitoring for the second downlink message including the dynamic grant. At 335, the UE 115-*b* may communicate a second uplink message based on the dynamic grant.

Figure 4:
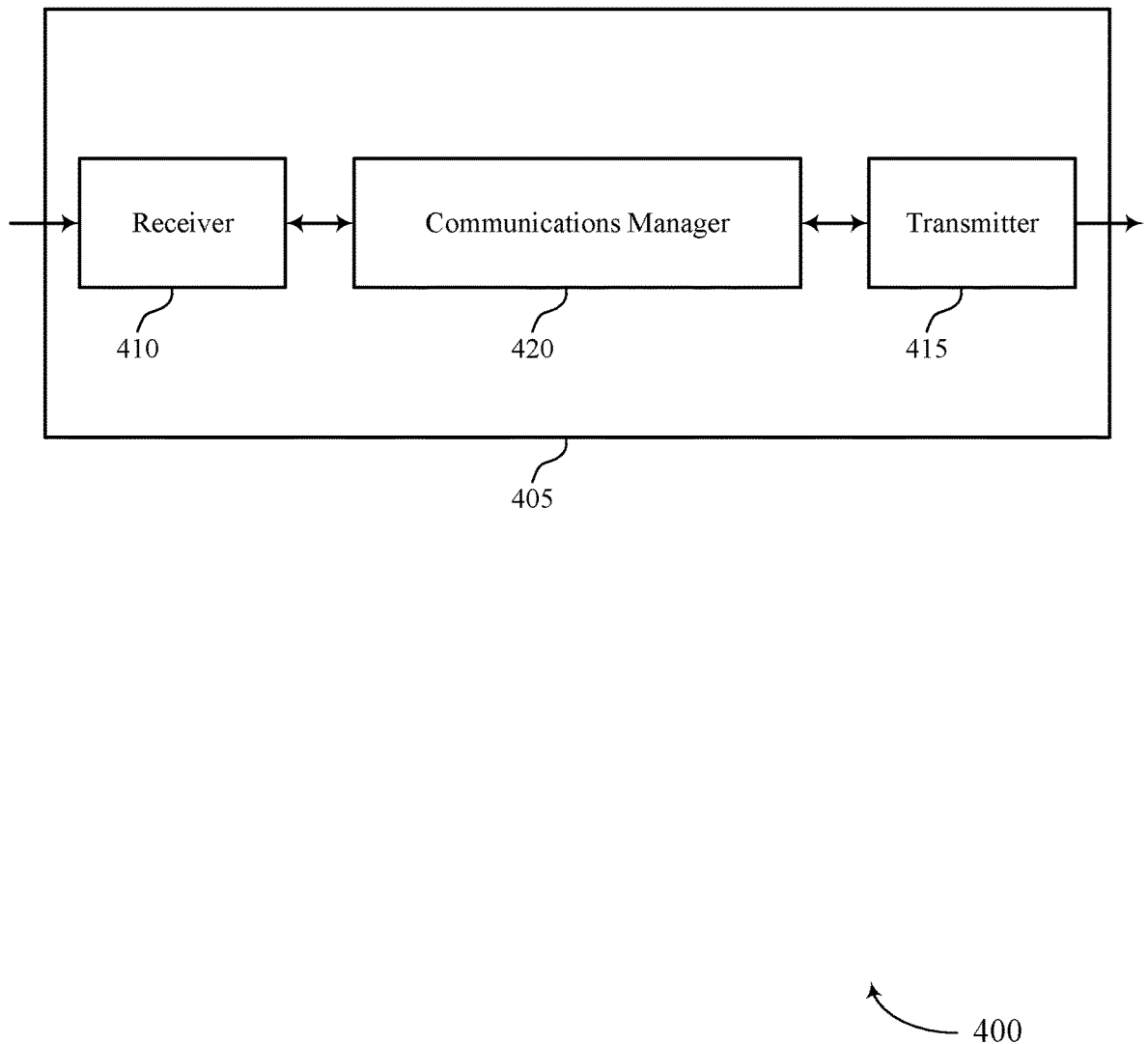
FIGS. 4 and 5 show block diagrams of devices that support LP-WUS for SDT in accordance with one or more aspects of the present disclosure.

FIG. 4 shows a block diagram 400 of a device 405 that supports LP-WUS for SDT in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to LP-WUS for SDT). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to LP-WUS for SDT). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of LP-WUS for SDT as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a graphics processing unit (GPU), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software) executed by at least one processor. If implemented in code executed by at least one processor, the functions of the communications manager 420, the receiver 410, the transmitter 415, or various combinations or components thereof may be performed by a general-purpose processor, a DSP, a GPU, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving control signaling including a configuration of resources for a subsequent transmission by the UE of a first uplink message having a data size below a configured threshold. The communications manager 420 is capable of, configured to, or operable to support a means for transmitting the first uplink message in the resources indicated by the control signaling, the first uplink message having the data size below the configured threshold. The communications manager 420 is capable of, configured to, or operable to support a means for monitoring for a first downlink message from a network entity in response to transmitting the first uplink message, the first downlink message including an LP-WUS. The communications manager 420 is capable of, configured to, or operable to support a means for monitoring, in response to detection of the LP-WUS, for a second downlink message from the network entity, the second downlink message including a dynamic grant. The communications manager 420 is capable of, configured to, or operable to support a means for communicating a second uplink message based on the dynamic grant.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reducing power consumption by the UE 115 remaining in an inactive state (e.g., sleeping) in the absence of a dynamic grant from the network entity 105 (e.g., no longer continuously monitoring PDCCH).

Figure 5:
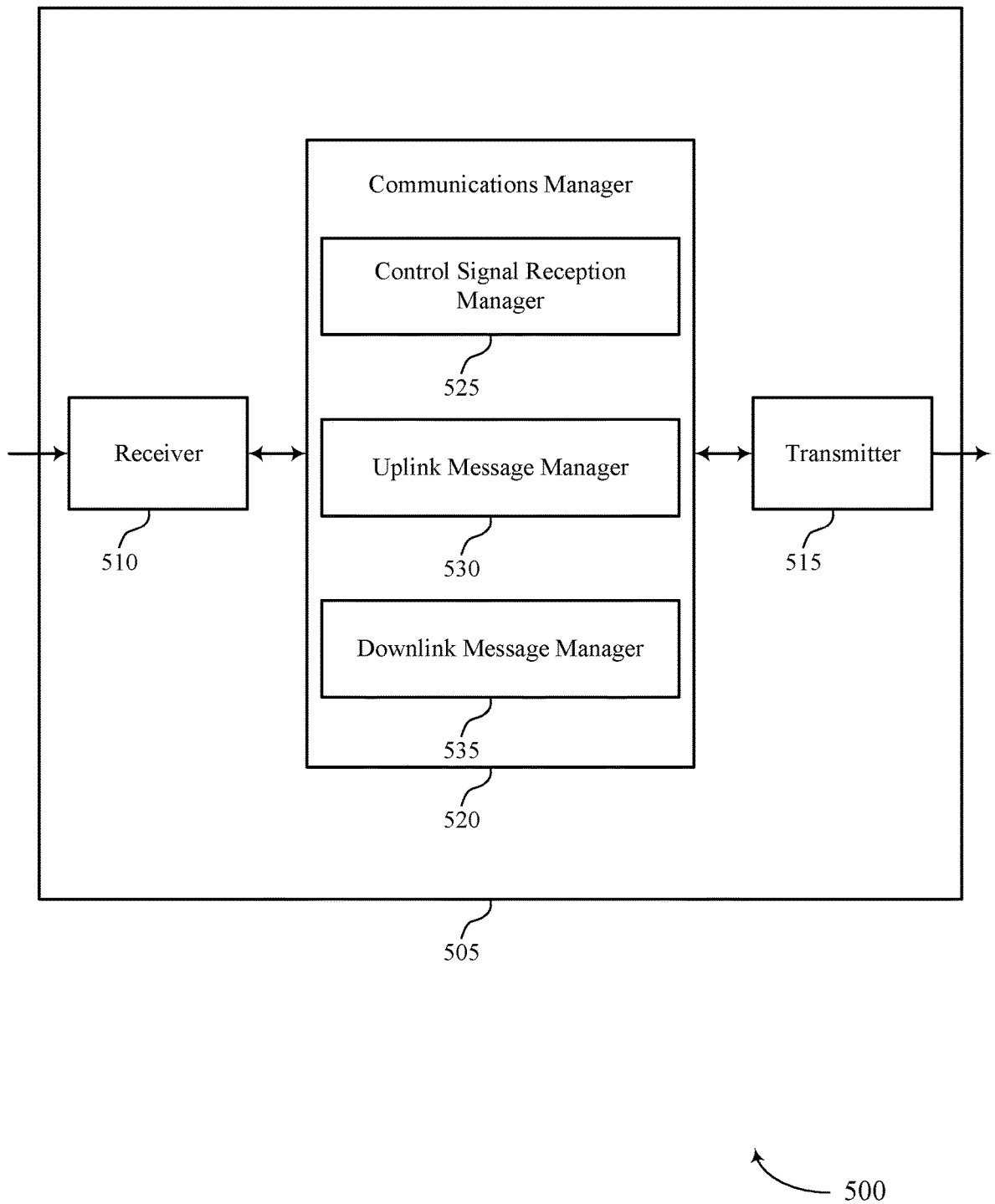

FIG. 5 shows a block diagram 500 of a device 505 that supports LP-WUS for SDT in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to LP-WUS for SDT). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to LP-WUS for SDT). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of LP-WUS for SDT as described herein. For example, the communications manager 520 may include a control signal reception manager 525, an uplink message manager 530, a downlink message manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The control signal reception manager 525 is capable of, configured to, or operable to support a means for receiving control signaling including a configuration of resources for a subsequent transmission by the UE of a first uplink message having a data size below a configured threshold. The uplink message manager 530 is capable of, configured to, or operable to support a means for transmitting the first uplink message in the resources indicated by the control signaling, the first uplink message having the data size below the configured threshold. The downlink message manager 535 is capable of, configured to, or operable to support a means for monitoring for a first downlink message from a network entity in response to transmitting the first uplink message, the first downlink message including an LP-WUS. The downlink message manager 535 is capable of, configured to, or operable to support a means for monitoring, in response to detection of the LP-WUS, for a second downlink message from the network entity, the second downlink message including a dynamic grant. The uplink message manager 530 is capable of, configured to, or operable to support a means for communicating a second uplink message based on the dynamic grant.

Figure 6:
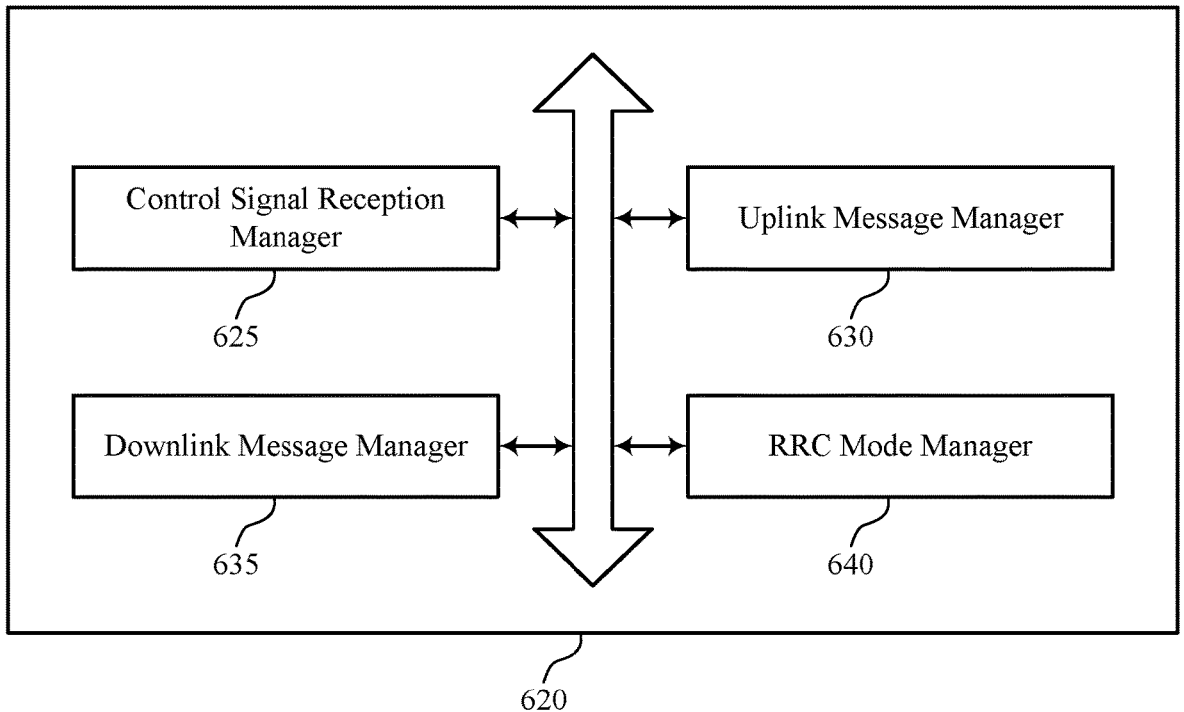
FIG. 6 shows a block diagram of a communications manager that supports LP-WUS for SDT in accordance with one or more aspects of the present disclosure.

FIG. 6 shows a block diagram 600 of a communications manager 620 that supports LP-WUS for SDT in accordance with one or more aspects of the present disclosure. The communications manager 620 may be an example of aspects of a communications manager 420, a communications manager 520, or both, as described herein. The communications manager 620, or various components thereof, may be an example of means for performing various aspects of LP-WUS for SDT as described herein. For example, the communications manager 620 may include a control signal reception manager 625, an uplink message manager 630, a downlink message manager 635, an RRC mode manager 640, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The control signal reception manager 625 is capable of, configured to, or operable to support a means for receiving control signaling including a configuration of resources for a subsequent transmission by the UE of a first uplink message having a data size below a configured threshold. The uplink message manager 630 is capable of, configured to, or operable to support a means for transmitting the first uplink message in the resources indicated by the control signaling, the first uplink message having the data size below the configured threshold. The downlink message manager 635 is capable of, configured to, or operable to support a means for monitoring for a first downlink message from a network entity in response to transmitting the first uplink message, the first downlink message including an LP-WUS. In some examples, the downlink message manager 635 is capable of, configured to, or operable to support a means for monitoring, in response to detection of the LP-WUS, for a second downlink message from the network entity, the second downlink message including a dynamic grant. In some examples, the uplink message manager 630 is capable of, configured to, or operable to support a means for communicating a second uplink message based on the dynamic grant.

In some examples, to support monitoring for the first downlink message and monitoring for the second downlink message, the downlink message manager 635 is capable of, configured to, or operable to support a means for monitoring for the first downlink message in a first power state. In some examples, to support monitoring for the first downlink message and monitoring for the second downlink message, the downlink message manager 635 is capable of, configured to, or operable to support a means for monitoring for the second downlink message in a second power state, the first power state corresponding to less power consumption at the UE than the second power state.

In some examples, the first power state is associated with a first radio at the UE and the second power state is associated with a second radio at the UE.

In some examples, the control signaling includes a radio resource control release message, and the RRC mode manager 640 is capable of, configured to, or operable to support a means for entering a radio resource control inactive mode in response to receiving the radio resource control release message. In some examples, the control signaling includes a radio resource control release message, and the uplink message manager 630 is capable of, configured to, or operable to support a means for transmitting a radio resource control resume request in the first uplink message.

In some examples, the LP-WUS includes an updated configuration for the resources indicated by the control signaling.

In some examples, the LP-WUS includes a message to activate, deactivate, update, release, or any combination thereof, one or more configuration parameters associated with the resources indicated by the control signaling.

In some examples, the LP-WUS includes an update to a TAT associated with the resources indicated by the control signaling, or an update to an RSRP threshold associated with a synchronization signal block, or both.

In some examples, the control signaling includes a radio resource control release message, and the RRC mode manager 640 is capable of, configured to, or operable to support a means for entering a radio resource control active mode in response to monitoring for the second downlink message including the dynamic grant.

In some examples, the configuration of resources for the subsequent transmission by the UE includes a configured grant resource configuration.

In some examples, the control signaling indicates a low-power wake-up radio configuration.

In some examples, the control signaling indicates a mapping between one or more monitoring occasions for the LP-WUS and one or more search space monitoring occasions.

In some examples, monitoring for the first downlink message is in response to a signal strength measurement of a low-power synchronization signal being greater than a signal strength threshold.

In some examples, the uplink message having the data size below the configured threshold includes a CG-SDT, or a RA-SDT, or both.

Figure 7:
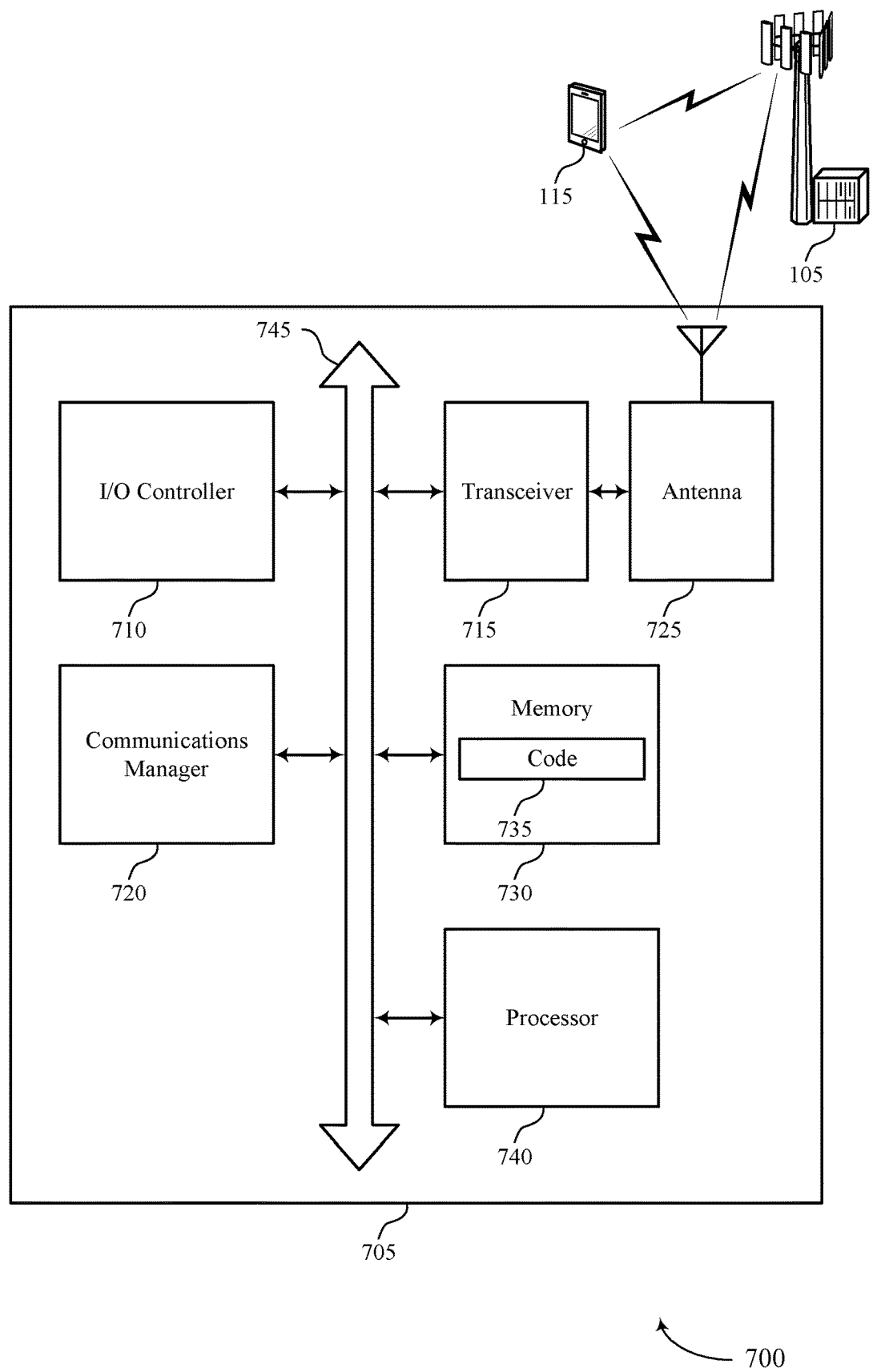
FIG. 7 shows a diagram of a system including a device that supports LP-WUS for SDT in accordance with one or more aspects of the present disclosure.

FIG. 7 shows a diagram of a system 700 including a device 705 that supports LP-WUS for SDT in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a GPU, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting LP-WUS for SDT). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving control signaling including a configuration of resources for a subsequent transmission by the UE of a first uplink message having a data size below a configured threshold. The communications manager 720 is capable of, configured to, or operable to support a means for transmitting the first uplink message in the resources indicated by the control signaling, the first uplink message having the data size below the configured threshold. The communications manager 720 is capable of, configured to, or operable to support a means for monitoring for a first downlink message from a network entity in response to transmitting the first uplink message, the first downlink message including an LP-WUS. The communications manager 720 is capable of, configured to, or operable to support a means for monitoring, in response to detection of the LP-WUS, for a second downlink message from the network entity, the second downlink message including a dynamic grant. The communications manager 720 is capable of, configured to, or operable to support a means for communicating a second uplink message based on the dynamic grant.

By including or configuring the communications manager 720 in accordance with examples as described herein, the device 705 may support techniques for reducing power consumption by the UE 115 remaining in an inactive state (e.g., sleeping) in the absence of a dynamic grant from the network entity 105 (e.g., no longer continuously monitoring PDCCH).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of LP-WUS for SDT as described herein, or the at least one processor 740 and the at least one memory 730 may be otherwise configured to, individually or collectively, perform or support such operations.

Figure 8:
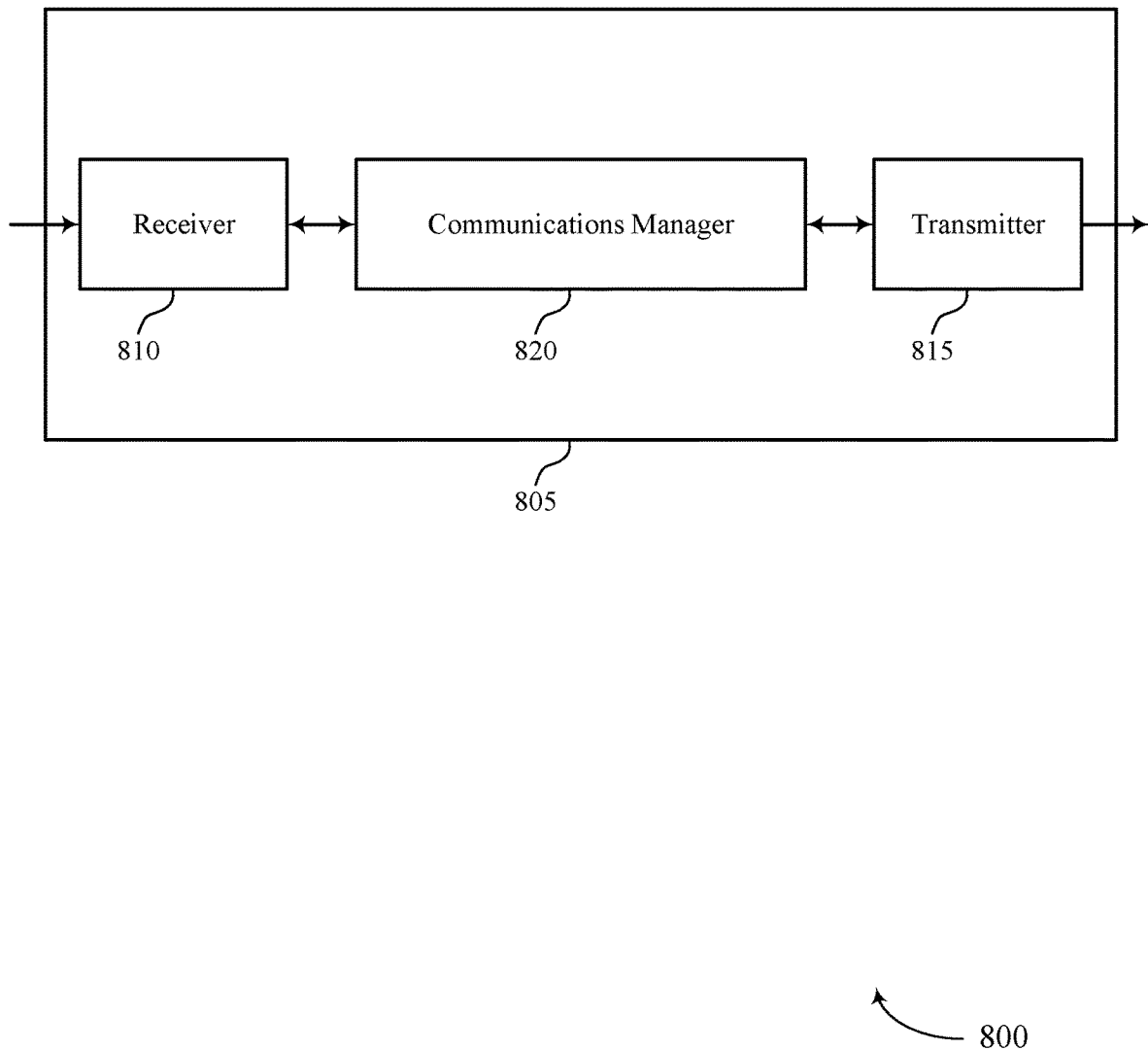
FIGS. 8 and 9 show block diagrams of devices that support LP-WUS for SDT in accordance with one or more aspects of the present disclosure.

FIG. 8 shows a block diagram 800 of a device 805 that supports LP-WUS for SDT in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of LP-WUS for SDT as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a GPU, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software) executed by at least one processor. If implemented in code executed by at least one processor, the functions of the communications manager 820, the receiver 810, the transmitter 815, or various combinations or components thereof may be performed by a general-purpose processor, a DSP, a GPU, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting control signaling including a configuration of resources for a subsequent reception from a UE of a first uplink message having a data size below a configured threshold. The communications manager 820 is capable of, configured to, or operable to support a means for receiving, from the UE, the first uplink message in the resources indicated by the control signaling, the first uplink message having the data size below the configured threshold. The communications manager 820 is capable of, configured to, or operable to support a means for transmitting a first downlink message to the UE in response to receiving the first uplink message, the first downlink message including an LP-WUS. The communications manager 820 is capable of, configured to, or operable to support a means for transmitting, in response to transmitting the LP-WUS, a second downlink message to the UE, the second downlink message including a dynamic grant. The communications manager 820 is capable of, configured to, or operable to support a means for receiving a second uplink message based on the dynamic grant.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reducing power consumption by the UE 115 remaining in an inactive state (e.g., sleeping) in the absence of a dynamic grant from the network entity 105 (e.g., no longer continuously monitoring PDCCH).

Figure 9:
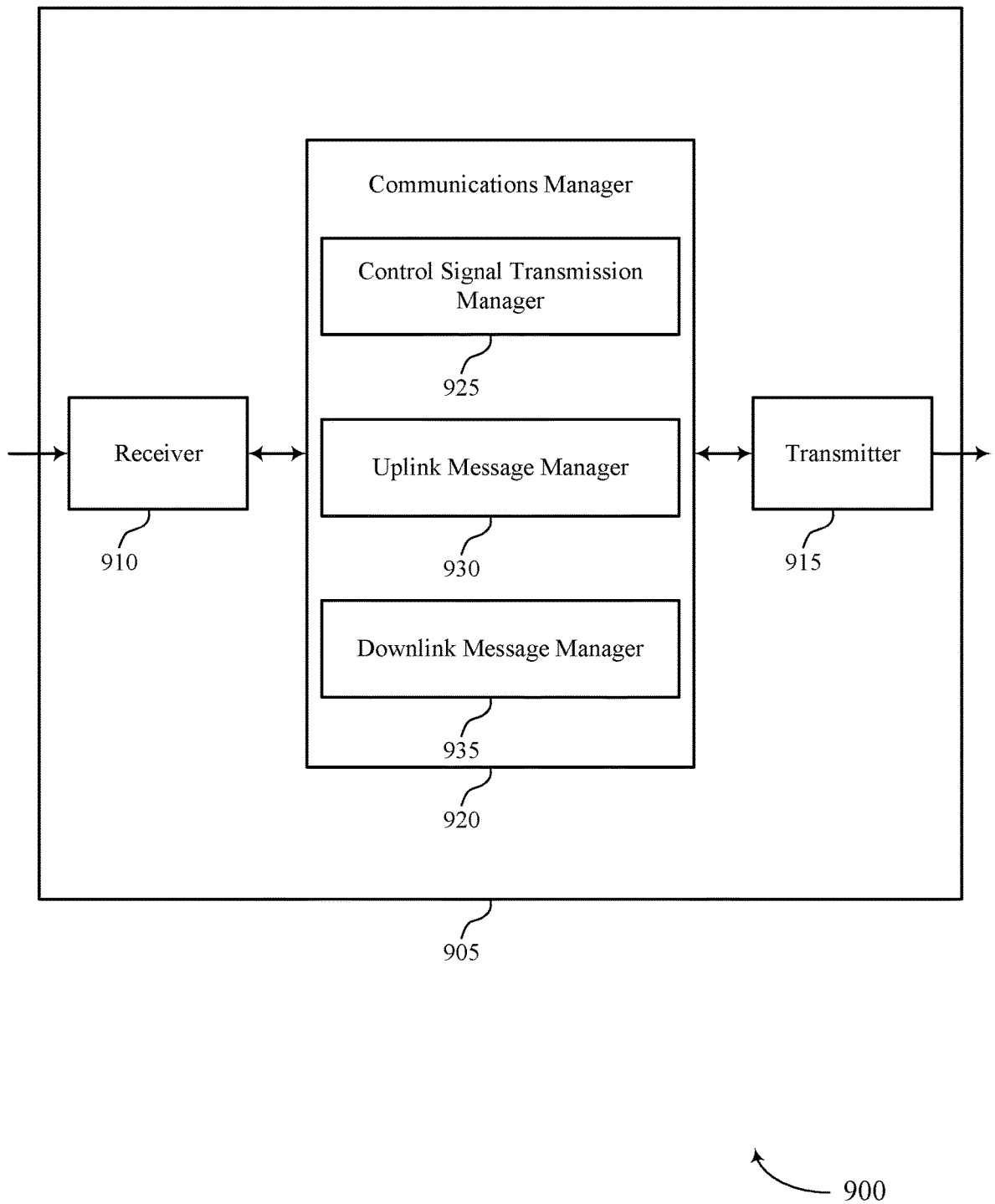

FIG. 9 shows a block diagram 900 of a device 905 that supports LP-WUS for SDT in accordance with one or more aspects of the present disclosure. The device 905 may be an example of aspects of a device 805 or a network entity 105 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of LP-WUS for SDT as described herein. For example, the communications manager 920 may include a control signal transmission manager 925, an uplink message manager 930, a downlink message manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The control signal transmission manager 925 is capable of, configured to, or operable to support a means for transmitting control signaling including a configuration of resources for a subsequent reception from a UE of a first uplink message having a data size below a configured threshold. The uplink message manager 930 is capable of, configured to, or operable to support a means for receiving, from the UE, the first uplink message in the resources indicated by the control signaling, the first uplink message having the data size below the configured threshold. The downlink message manager 935 is capable of, configured to, or operable to support a means for transmitting a first downlink message to the UE in response to receiving the first uplink message, the first downlink message including an LP-WUS. The downlink message manager 935 is capable of, configured to, or operable to support a means for transmitting, in response to transmitting the LP-WUS, a second downlink message to the UE, the second downlink message including a dynamic grant. The uplink message manager 930 is capable of, configured to, or operable to support a means for receiving a second uplink message based on the dynamic grant.

Figure 10:
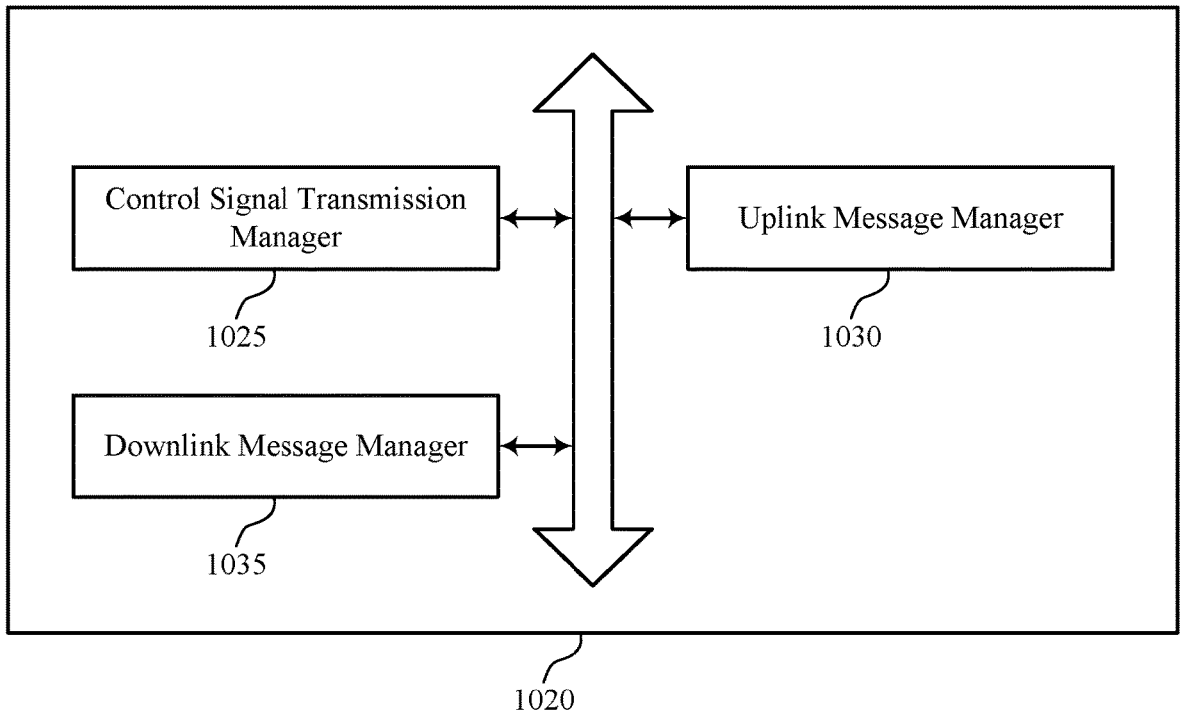
FIG. 10 shows a block diagram of a communications manager that supports LP-WUS for SDT in accordance with one or more aspects of the present disclosure.

FIG. 10 shows a block diagram 1000 of a communications manager 1020 that supports LP-WUS for SDT in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of LP-WUS for SDT as described herein. For example, the communications manager 1020 may include a control signal transmission manager 1025, an uplink message manager 1030, a downlink message manager 1035, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The control signal transmission manager 1025 is capable of, configured to, or operable to support a means for transmitting control signaling including a configuration of resources for a subsequent reception from a UE of a first uplink message having a data size below a configured threshold. The uplink message manager 1030 is capable of, configured to, or operable to support a means for receiving, from the UE, the first uplink message in the resources indicated by the control signaling, the first uplink message having the data size below the configured threshold. The downlink message manager 1035 is capable of, configured to, or operable to support a means for transmitting a first downlink message to the UE in response to receiving the first uplink message, the first downlink message including an LP-WUS. In some examples, the downlink message manager 1035 is capable of, configured to, or operable to support a means for transmitting, in response to transmitting the LP-WUS, a second downlink message to the UE, the second downlink message including a dynamic grant. In some examples, the uplink message manager 1030 is capable of, configured to, or operable to support a means for receiving a second uplink message based on the dynamic grant.

In some examples, the LP-WUS includes an updated configuration for the resources indicated by the control signaling.

In some examples, the LP-WUS includes a message to activate, deactivate, update, release, or any combination thereof, one or more configuration parameters associated with the resources indicated by the control signaling.

In some examples, the LP-WUS includes an update to a TAT associated with the resources indicated by the control signaling, or an update to an RSRP threshold associated with a synchronization signal block, or both.

In some examples, the configuration of resources includes a configured grant resource configuration.

In some examples, the control signaling indicates a low-power wake-up radio configuration.

In some examples, the control signaling indicates a mapping between one or more monitoring occasions for the LP-WUS and one or more search space monitoring occasions.

In some examples, transmitting the first downlink message is in response to a signal strength measurement of a low-power synchronization signal being greater than a signal strength threshold.

In some examples, the uplink message having the data size below the configured threshold includes a CG-SDT, or a RA-SDT, or both.

Figure 11:
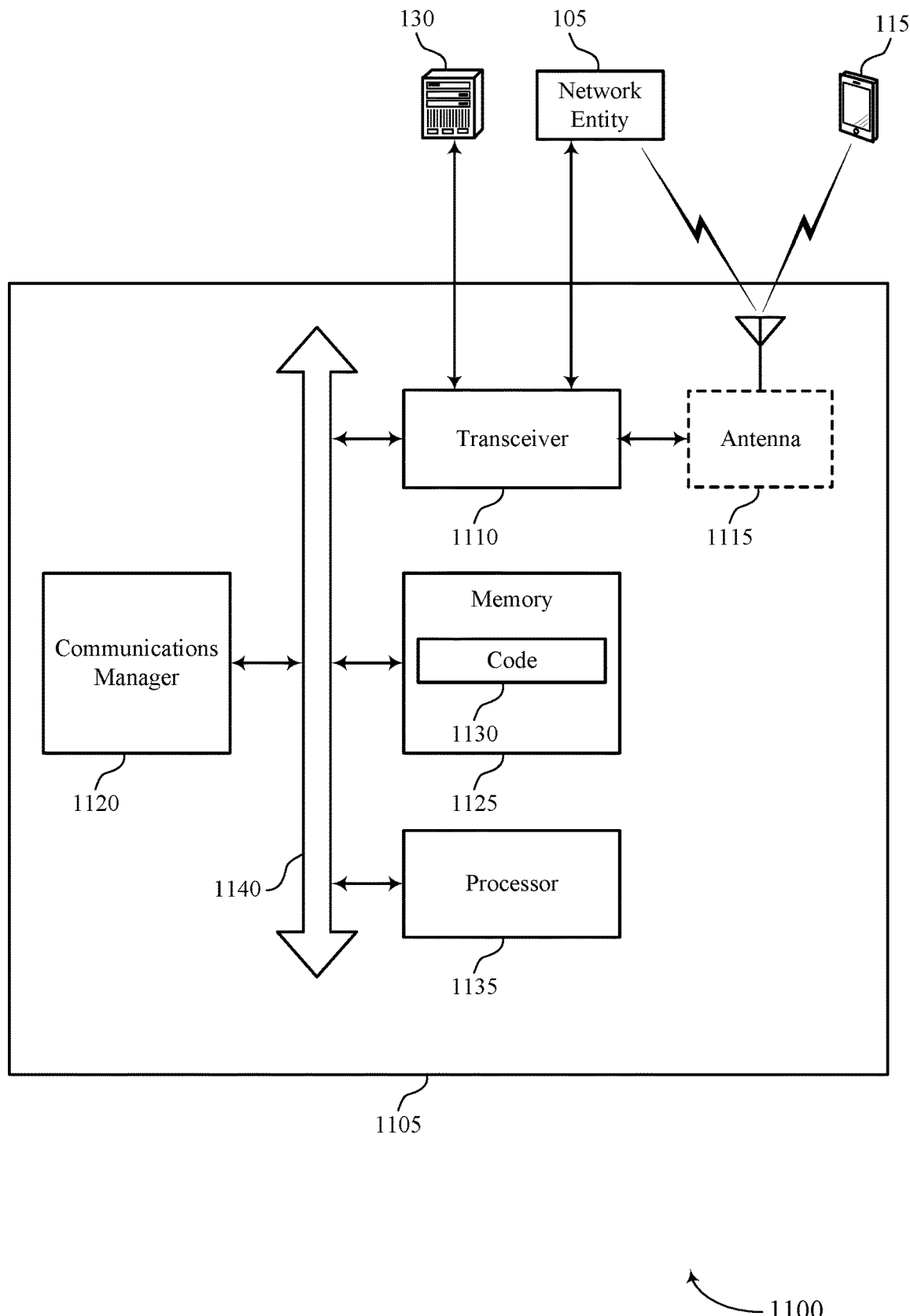
FIG. 11 shows a diagram of a system including a device that supports LP-WUS for SDT in accordance with one or more aspects of the present disclosure.

FIG. 11 shows a diagram of a system 1100 including a device 1105 that supports LP-WUS for SDT in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a GPU, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting LP-WUS for SDT). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting control signaling including a configuration of resources for a subsequent reception from a UE of a first uplink message having a data size below a configured threshold. The communications manager 1120 is capable of, configured to, or operable to support a means for receiving, from the UE, the first uplink message in the resources indicated by the control signaling, the first uplink message having the data size below the configured threshold. The communications manager 1120 is capable of, configured to, or operable to support a means for transmitting a first downlink message to the UE in response to receiving the first uplink message, the first downlink message including an LP-WUS. The communications manager 1120 is capable of, configured to, or operable to support a means for transmitting, in response to transmitting the LP-WUS, a second downlink message to the UE, the second downlink message including a dynamic grant. The communications manager 1120 is capable of, configured to, or operable to support a means for receiving a second uplink message based on the dynamic grant.

By including or configuring the communications manager 1120 in accordance with examples as described herein, the device 1105 may support techniques for reducing power consumption by the UE 115 remaining in an inactive state (e.g., sleeping) in the absence of a dynamic grant from the network entity 105 (e.g., no longer continuously monitoring PDCCH).

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of LP-WUS for SDT as described herein, or the at least one processor 1135 and the at least one memory 1125 may be otherwise configured to, individually or collectively, perform or support such operations.

Figure 12:
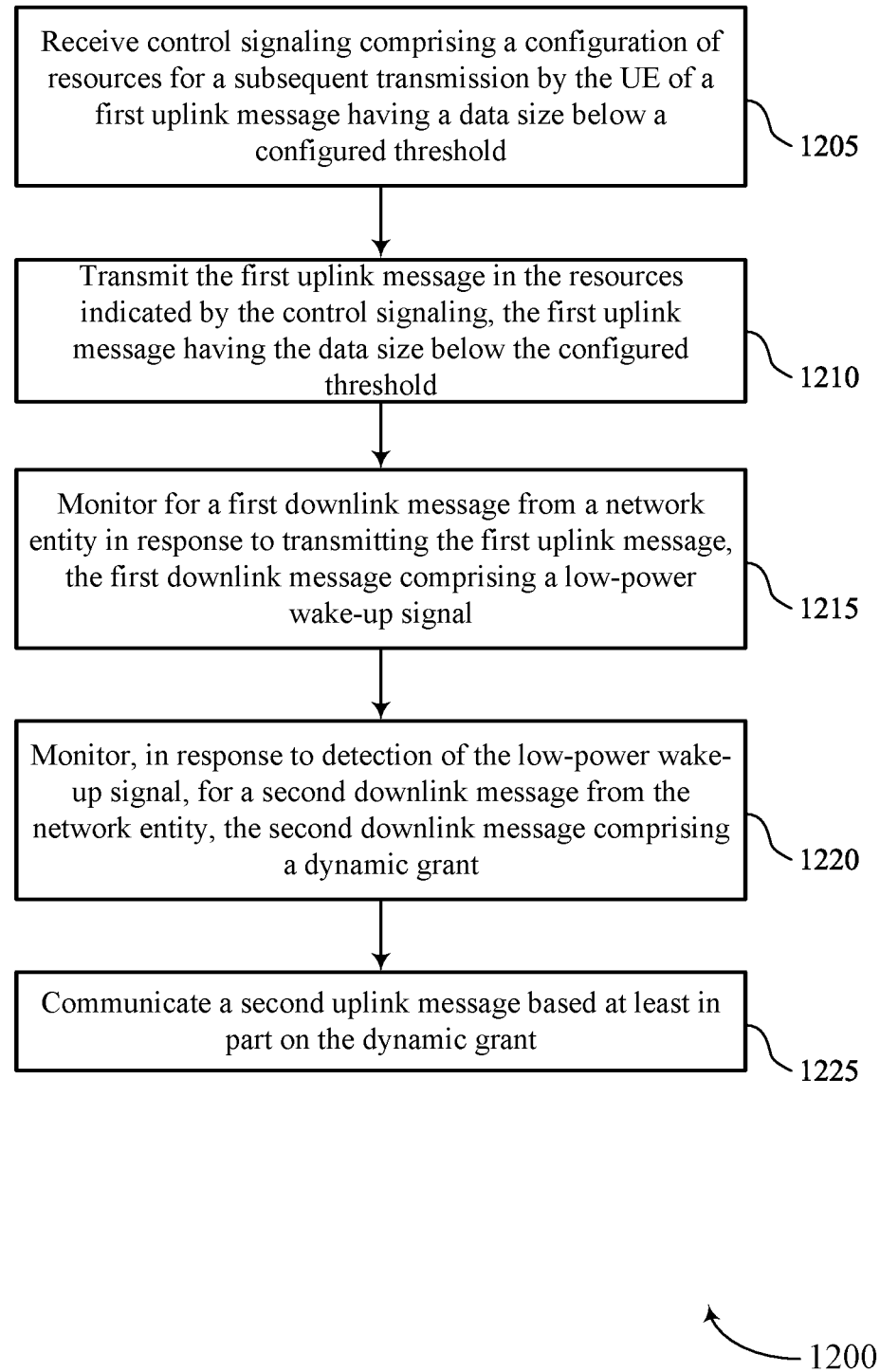
FIGS. 12 through 14 show flowcharts illustrating methods that support LP-WUS for SDT in accordance with one or more aspects of the present disclosure.

FIG. 12 shows a flowchart illustrating a method 1200 that supports LP-WUS for SDT in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling including a configuration of resources for a subsequent transmission by the UE of a first uplink message having a data size below a configured threshold. The operations of block 1205 may be performed in accordance with examples as disclosed herein. In some examples, aspects of the operations of 1205 may be performed by a control signal reception manager 625 as described with reference to FIG. 6.

At 1210, the method may include transmitting the first uplink message in the resources indicated by the control signaling, the first uplink message having the data size below the configured threshold. The operations of block 1210 may be performed in accordance with examples as disclosed herein. In some examples, aspects of the operations of 1210 may be performed by an uplink message manager 630 as described with reference to FIG. 6.

At 1215, the method may include monitoring for a first downlink message from a network entity in response to transmitting the first uplink message, the first downlink message including an LP-WUS. The operations of block 1215 may be performed in accordance with examples as disclosed herein. In some examples, aspects of the operations of 1215 may be performed by a downlink message manager 635 as described with reference to FIG. 6.

At 1220, the method may include monitoring, in response to detection of the LP-WUS, for a second downlink message from the network entity, the second downlink message including a dynamic grant. The operations of block 1220 may be performed in accordance with examples as disclosed herein. In some examples, aspects of the operations of 1220 may be performed by a downlink message manager 635 as described with reference to FIG. 6.

At 1225, the method may include communicating a second uplink message based on the dynamic grant. The operations of block 1225 may be performed in accordance with examples as disclosed herein. In some examples, aspects of the operations of 1225 may be performed by an uplink message manager 630 as described with reference to FIG. 6.

Figure 13:
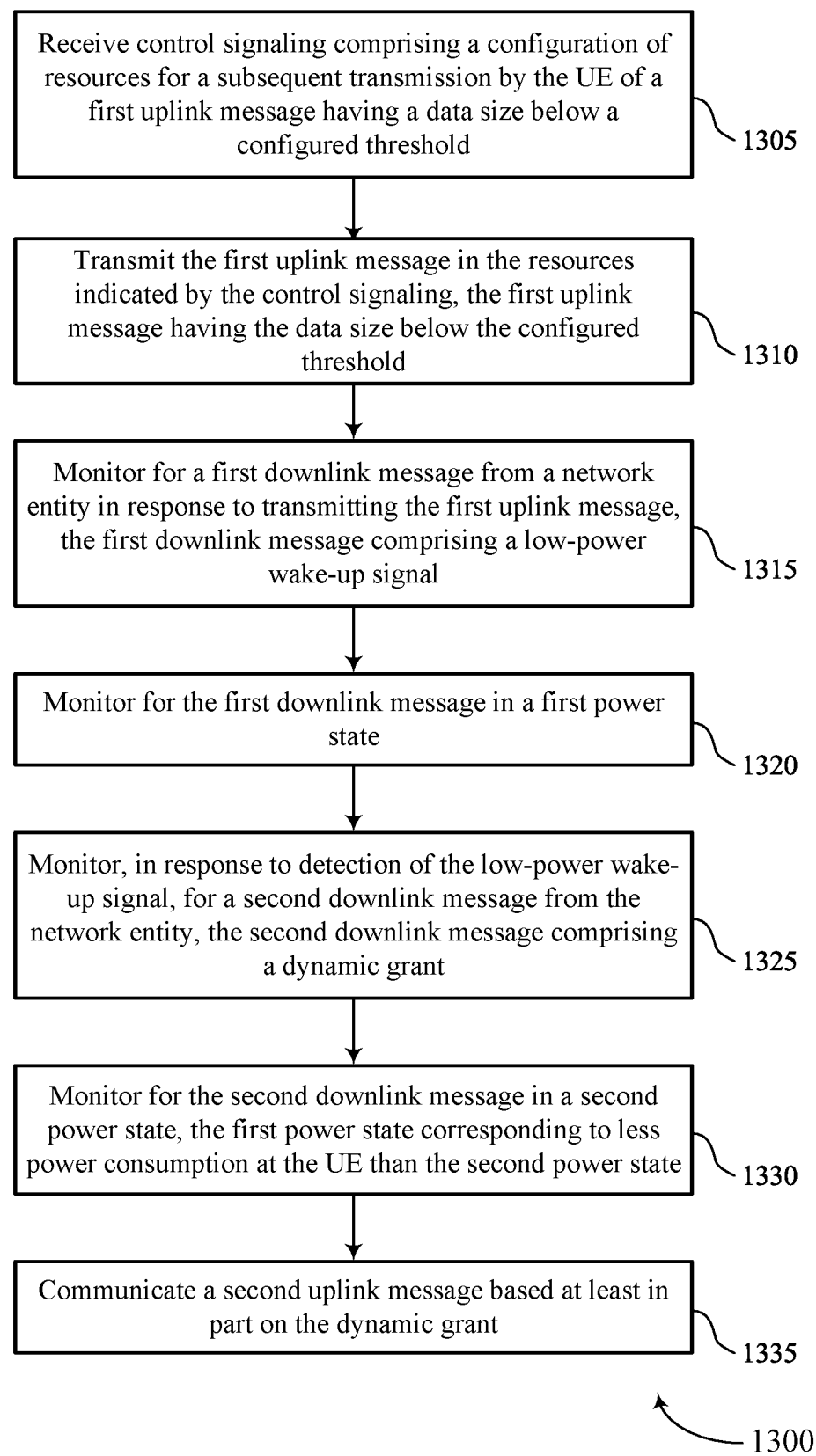

FIG. 13 shows a flowchart illustrating a method 1300 that supports LP-WUS for SDT in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving control signaling including a configuration of resources for a subsequent transmission by the UE of a first uplink message having a data size below a configured threshold. The operations of block 1305 may be performed in accordance with examples as disclosed herein. In some examples, aspects of the operations of 1305 may be performed by a control signal reception manager 625 as described with reference to FIG. 6.

At 1310, the method may include transmitting the first uplink message in the resources indicated by the control signaling, the first uplink message having the data size below the configured threshold. The operations of block 1310 may be performed in accordance with examples as disclosed herein. In some examples, aspects of the operations of 1310 may be performed by an uplink message manager 630 as described with reference to FIG. 6.

At 1315, the method may include monitoring for a first downlink message from a network entity in response to transmitting the first uplink message, the first downlink message including an LP-WUS. The operations of block 1315 may be performed in accordance with examples as disclosed herein. In some examples, aspects of the operations of 1315 may be performed by a downlink message manager 635 as described with reference to FIG. 6.

At 1320, the method may include monitoring for the first downlink message in a first power state. The operations of block 1320 may be performed in accordance with examples as disclosed herein. In some examples, aspects of the operations of 1320 may be performed by a downlink message manager 635 as described with reference to FIG. 6.

At 1325, the method may include monitoring, in response to detection of the LP-WUS, for a second downlink message from the network entity, the second downlink message including a dynamic grant. The operations of block 1325 may be performed in accordance with examples as disclosed herein. In some examples, aspects of the operations of 1325 may be performed by a downlink message manager 635 as described with reference to FIG. 6.

At 1330, the method may include monitoring for the second downlink message in a second power state, the first power state corresponding to less power consumption at the UE than the second power state. The operations of block 1330 may be performed in accordance with examples as disclosed herein. In some examples, aspects of the operations of 1330 may be performed by a downlink message manager 635 as described with reference to FIG. 6.

At 1335, the method may include communicating a second uplink message based on the dynamic grant. The operations of block 1335 may be performed in accordance with examples as disclosed herein. In some examples, aspects of the operations of 1335 may be performed by an uplink message manager 630 as described with reference to FIG. 6.

Figure 14:
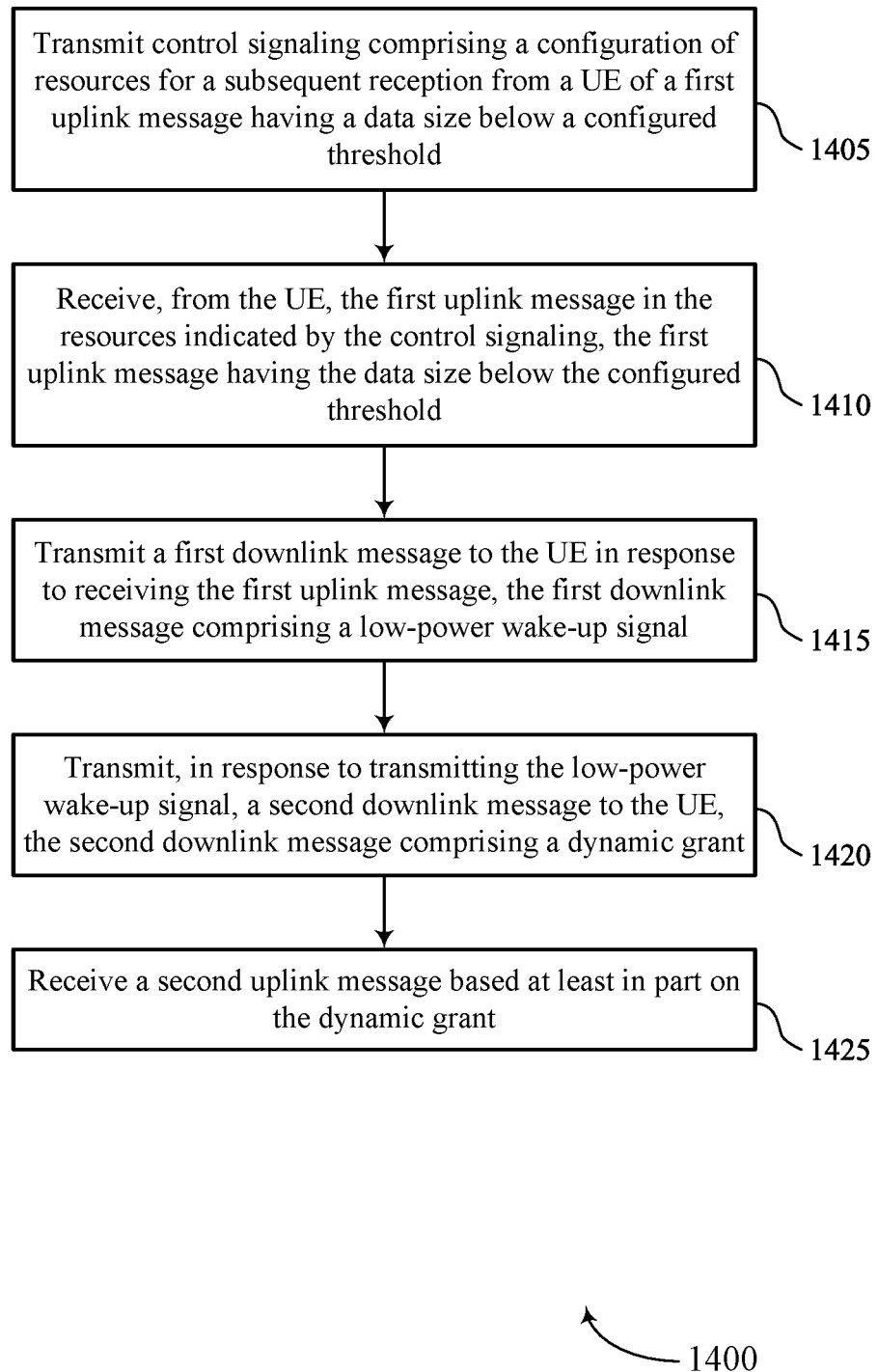

FIG. 14 shows a flowchart illustrating a method 1400 that supports LP-WUS for SDT in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting control signaling comprising a configuration of resources for a subsequent reception from a UE of a first uplink message having a data size below a configured threshold. The operations of block 1405 may be performed in accordance with examples as disclosed herein. In some examples, aspects of the operations of 1405 may be performed by a control signal transmission manager 1025 as described with reference to FIG. 10.

At 1410, the method may include receiving, from the UE, the first uplink message in the resources indicated by the control signaling, the first uplink message having the data size below the configured threshold. The operations of block 1410 may be performed in accordance with examples as disclosed herein. In some examples, aspects of the operations of 1410 may be performed by an uplink message manager 1030 as described with reference to FIG. 10.

At 1415, the method may include transmitting a first downlink message to the UE in response to receiving the first uplink message, the first downlink message comprising an LP-WUS. The operations of block 1415 may be performed in accordance with examples as disclosed herein. In some examples, aspects of the operations of 1415 may be performed by a downlink message manager 1035 as described with reference to FIG. 10.

At 1420, the method may include transmitting, in response to transmitting the LP-WUS, a second downlink message to the UE, the second downlink message comprising a dynamic grant. The operations of block 1420 may be performed in accordance with examples as disclosed herein. In some examples, aspects of the operations of 1420 may be performed by a downlink message manager 1035 as described with reference to FIG. 10.

At 1425, the method may include receiving a second uplink message based at least in part on the dynamic grant. The operations of block 1425 may be performed in accordance with examples as disclosed herein. In some examples, aspects of the operations of 1425 may be performed by an uplink message manager 1030 as described with reference to FIG. 10. The following provides an overview of aspects of the present disclosure:

Aspect 1: A method for wireless communications at a UE, comprising: receiving control signaling comprising a configuration of resources for a subsequent transmission by the UE of a first uplink message having a data size below a configured threshold; transmitting the first uplink message in the resources indicated by the control signaling, the first uplink message having the data size below the configured threshold; monitoring for a first downlink message from a network entity in response to transmitting the first uplink message, the first downlink message comprising an LP-WUS; monitoring, in response to detection of the LP-WUS, for a second downlink message from the network entity, the second downlink message comprising a dynamic grant; and communicating a second uplink message based at least in part on the dynamic grant.

Aspect 2: The method of aspect 1, wherein monitoring for the first downlink message and monitoring for the second downlink message further comprises: monitoring for the first downlink message in a first power state; and monitoring for the second downlink message in a second power state, the first power state corresponding to less power consumption at the UE than the second power state.

Aspect 3: The method of aspect 2, wherein the first power state is associated with a first radio at the UE and the second power state is associated with a second radio at the UE.

Aspect 4: The method of any of aspects 1 through 3, wherein the control signaling comprises an RRC release message, the method further comprising: entering a RRC inactive mode in response to receiving the RRC release message; and transmitting an RRC resume request in the first uplink message.

Aspect 5: The method of any of aspects 1 through 4, wherein the LP-WUS comprises an updated configuration for the resources indicated by the control signaling.

Aspect 6: The method of any of aspects 1 through 5, wherein the LP-WUS comprises a message to activate, deactivate, update, release, or any combination thereof, one or more configuration parameters associated with the resources indicated by the control signaling.

Aspect 7: The method of any of aspects 1 through 6, wherein the LP-WUS comprises an update to a TAT associated with the resources indicated by the control signaling, or an update to a RSRP threshold associated with a SSB, or both.

Aspect 8: The method of any of aspects 1 through 7, wherein the control signaling comprises a RRC release message, the method further comprising: entering a RRC active mode in response to monitoring for the second downlink message comprising the dynamic grant.

Aspect 9: The method of any of aspects 1 through 8, wherein the configuration of resources for the subsequent transmission by the UE comprises a configured grant resource configuration.

Aspect 10: The method of aspect 9, wherein the control signaling indicates a LP-WUR configuration.

Aspect 11: The method of any of aspects 1 through 10, wherein the control signaling indicates a mapping between one or more monitoring occasions for the LP-WUS and one or more search space monitoring occasions.

Aspect 12: The method of any of aspects 1 through 11, wherein monitoring for the first downlink message is in response to a signal strength measurement of a LP-SS signal being greater than a signal strength threshold.

Aspect 13: The method of any of aspects 1 through 12, wherein the uplink message having the data size below the configured threshold comprises CG-SDT, or a RA-SDT, or both.

Aspect 14: A method for wireless communications at a network entity, comprising: transmitting control signaling comprising a configuration of resources for a subsequent reception from a UE of a first uplink message having a data size below a configured threshold; receiving, from the UE, the first uplink message in the resources indicated by the control signaling, the first uplink message having the data size below the configured threshold; transmitting a first downlink message to the UE in response to receiving the first uplink message, the first downlink message comprising an LP-WUS; transmitting, in response to transmitting the LP-WUS, a second downlink message to the UE, the second downlink message comprising a dynamic grant; and receiving a second uplink message based at least in part on the dynamic grant.

Aspect 15: The method of aspect 14, wherein the LP-WUS comprises an updated configuration for the resources indicated by the control signaling.

Aspect 16: The method of any of aspects 14 through 15, wherein the LP-WUS comprises a message to activate, deactivate, update, release, or any combination thereof, one or more configuration parameters associated with the resources indicated by the control signaling.

Aspect 17: The method of any of aspects 14 through 16, wherein the LP-WUS comprises an update to a TAT associated with the resources indicated by the control signaling, or an update to a RSRP threshold associated with a SSB, or both.

Aspect 18: The method of any of aspects 14 through 17, wherein the configuration of resources comprises a configured grant resource configuration.

Aspect 19: The method of aspect 18, wherein the control signaling indicates a LP-WUR configuration.

Aspect 20: The method of any of aspects 14 through 19, wherein the control signaling indicates a mapping between one or more monitoring occasions for the LP-WUS and one or more search space monitoring occasions.

Aspect 21: The method of any of aspects 14 through 20, wherein transmitting the first downlink message is in response to a signal strength measurement of a LP-SS being greater than a signal strength threshold.

Aspect 22: The method of any of aspects 14 through 21, wherein the uplink message having the data size below the configured threshold comprises a CG-SDT, or a RA-SDT, or both.

Aspect 23: A UE for wireless communications, comprising one or more memories storing processor-executable code, and one or more processors coupled with the one or more memories and individually or collectively operable to execute the code to cause the UE to perform a method of any of aspects 1 through 13.

Aspect 24: A UE for wireless communications, comprising at least one means for performing a method of any of aspects 1 through 13.

Aspect 25: A non-transitory computer-readable medium storing code for wireless communications, the code comprising instructions executable by at least one processor (e.g., directly, indirectly, after pre-processing, without pre-processing) to perform a method of any of aspects 1 through 13.

Aspect 26: A network entity for wireless communications, comprising one or more memories storing processor-executable code, and one or more processors coupled with the one or more memories and individually or collectively operable to execute the code to cause the network entity to perform a method of any of aspects 14 through 22.

Aspect 27: A network entity for wireless communications, comprising at least one means for performing a method of any of aspects 14 through 22.

Aspect 28: A non-transitory computer-readable medium storing code for wireless communications, the code comprising instructions executable by at least one processor (e.g., directly, indirectly, after pre-processing, without pre-processing) to perform a method of any of aspects 14 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive control signaling comprising a configuration of resources for a subsequent transmission by the UE of a first uplink message having a data size below a configured threshold;
transmit the first uplink message in the resources indicated by the control signaling, the first uplink message having the data size below the configured threshold;
monitor for a first downlink message from a network entity in response to transmitting the first uplink message, the first downlink message comprising a low-power wake-up signal;
monitor, in response to detection of the low-power wake-up signal, for a second downlink message from the network entity, the second downlink message comprising a dynamic grant; and
communicate a second uplink message based at least in part on the dynamic grant.

2. The UE of claim 1, wherein, to monitor for the first downlink message and monitor for the second downlink message, the one or more processors are individually or collectively further operable to execute the code to cause the UE to:
monitor for the first downlink message in a first power state; and
monitor for the second downlink message in a second power state, the first power state corresponding to less power consumption at the UE than the second power state.

3. The UE of claim 2, wherein the first power state is associated with a first radio at the UE and the second power state is associated with a second radio at the UE.

4. The UE of claim 1, wherein the control signaling comprises a radio resource control release message, and the one or more processors are individually or collectively further operable to execute the code to cause the UE to:
enter a radio resource control inactive mode in response to receiving the radio resource control release message; and
transmit a radio resource control resume request in the first uplink message.

5. The UE of claim 1, wherein the low-power wake-up signal comprises an updated configuration for the resources indicated by the control signaling.

6. The UE of claim 1, wherein the low-power wake-up signal comprises a message to activate, deactivate, update, release, or any combination thereof, one or more configuration parameters associated with the resources indicated by the control signaling.

7. The UE of claim 1, wherein the low-power wake-up signal comprises an update to a timing alignment timer associated with the resources indicated by the control signaling, or an update to a reference signal received power threshold associated with a synchronization signal block, or both.

8. The UE of claim 1, wherein the control signaling comprises a radio resource control release message, and the one or more processors are individually or collectively further operable to execute the code to cause the UE to:
enter a radio resource control active mode in response to monitoring for the second downlink message comprising the dynamic grant.

9. The UE of claim 1, wherein the configuration of resources for the subsequent transmission by the UE comprises a configured grant resource configuration.

10. The UE of claim 9, wherein the control signaling indicates a low-power wake-up radio configuration.

11. The UE of claim 1, wherein the control signaling indicates a mapping between one or more monitoring occasions for the low-power wake-up signal and one or more search space monitoring occasions.

12. The UE of claim 1, wherein monitoring for the first downlink message is in response to a signal strength measurement of a low-power synchronization signal being greater than a signal strength threshold.

13. The UE of claim 1, wherein the first uplink message having the data size below the configured threshold comprises a configured grant small data transmission, or a random access small data transmission, or both.

14. A network entity, comprising:
one or more memories storing processor-executable code; and
one or more processors coupled with the one or more memories and individually or collectively operable to execute the code to cause the network entity to:
transmit control signaling comprising a configuration of resources for a subsequent reception from a user equipment (UE) of a first uplink message having a data size below a configured threshold;
receive, from the UE, the first uplink message in the resources indicated by the control signaling, the first uplink message having the data size below the configured threshold;
transmit a first downlink message to the UE in response to receiving the first uplink message, the first downlink message comprising a low-power wake-up signal;
transmit, in response to transmitting the low-power wake-up signal, a second downlink message to the UE, the second downlink message comprising a dynamic grant; and
receive a second uplink message based at least in part on the dynamic grant.

15. The network entity of claim 14, wherein the low-power wake-up signal comprises an updated configuration for the resources indicated by the control signaling.

16. The network entity of claim 14, wherein the low-power wake-up signal comprises a message to activate, deactivate, update, release, or any combination thereof, one or more configuration parameters associated with the resources indicated by the control signaling.

17. The network entity of claim 14, wherein the low-power wake-up signal comprises an update to a timing alignment timer associated with the resources indicated by the control signaling, or an update to a reference signal received power threshold associated with a synchronization signal block, or both.

18. The network entity of claim 14, wherein the configuration of resources comprises a configured grant resource configuration.

19. The network entity of claim 18, wherein the control signaling indicates a low-power wake-up radio configuration.

20. The network entity of claim 14, wherein the control signaling indicates a mapping between one or more monitoring occasions for the low-power wake-up signal and one or more search space monitoring occasions.

21. The network entity of claim 14, wherein transmitting the first downlink message is in response to a signal strength measurement of a low-power synchronization signal being greater than a signal strength threshold.

22. The network entity of claim 14, wherein the first uplink message having the data size below the configured threshold comprises a configured grant small data transmission, or a random access small data transmission, or both.

23. A method for wireless communications at a user equipment (UE), comprising:
receiving control signaling comprising a configuration of resources for a subsequent transmission by the UE of a first uplink message having a data size below a configured threshold;
transmitting the first uplink message in the resources indicated by the control signaling, the first uplink message having the data size below the configured threshold;
monitoring for a first downlink message from a network entity in response to transmitting the first uplink message, the first downlink message comprising a low-power wake-up signal;
monitoring, in response to detection of the low-power wake-up signal, for a second downlink message from the network entity, the second downlink message comprising a dynamic grant; and
communicating a second uplink message based at least in part on the dynamic grant.

24. The method of claim 23, wherein monitoring for the first downlink message and monitoring for the second downlink message further comprises:
monitoring for the first downlink message in a first power state; and
monitoring for the second downlink message in a second power state, the first power state corresponding to less power consumption at the UE than the second power state.

25. The method of claim 24, wherein the first power state is associated with a first radio at the UE and the second power state is associated with a second radio at the UE.

26. The method of claim 23, wherein the control signaling comprises a radio resource control release message, the method further comprising:
entering a radio resource control inactive mode in response to receiving the radio resource control release message; and
transmitting a radio resource control resume request in the first uplink message.

27. A method for wireless communications at a network entity, comprising:
transmitting control signaling comprising a configuration of resources for a subsequent reception from a user equipment (UE) of a first uplink message having a data size below a configured threshold;

receiving, from the UE, the first uplink message in the resources indicated by the control signaling, the first uplink message having the data size below the configured threshold;

transmitting a first downlink message to the UE in response to receiving the first uplink message, the first downlink message comprising a low-power wake-up signal;

transmitting, in response to transmitting the low-power wake-up signal, a second downlink message to the UE, the second downlink message comprising a dynamic grant; and receiving a second uplink message based at least in part on the dynamic grant.

28. The method of claim 27, wherein the configuration of resources comprises a configured grant resource configuration.

29. The method of claim 28, wherein the control signaling indicates a low-power wake-up radio configuration.

30. The method of claim 27, wherein the control signaling indicates a mapping between one or more monitoring occasions for the low-power wake-up signal and one or more search space monitoring occasions.

* * * * *